Figure 1:
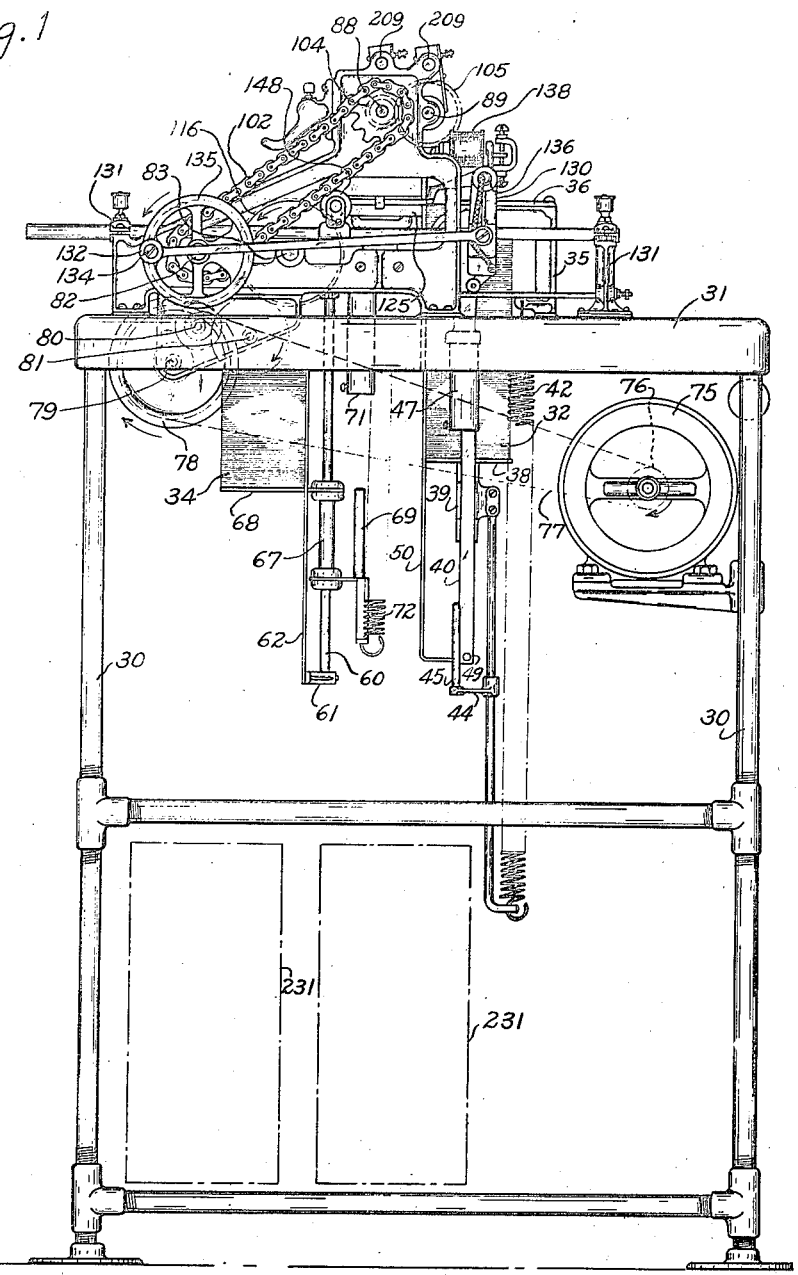

Sept. 22, 1931.  C. A. TRIPP  1,824,581
PUNCHED CARD ACCOUNTING MACHINE
Filed June 9, 1917   12 Sheets-Sheet 1

WITNESSES:
Robert B. Jordan
Josephine Gasper

INVENTOR
Charles A. Tripp
BY
Hood Ashley.
ATTORNEY

Sept. 22, 1931.          C. A. TRIPP          1,824,581
PUNCHED CARD ACCOUNTING MACHINE
Filed June 9, 1917          12 Sheets-Sheet 4
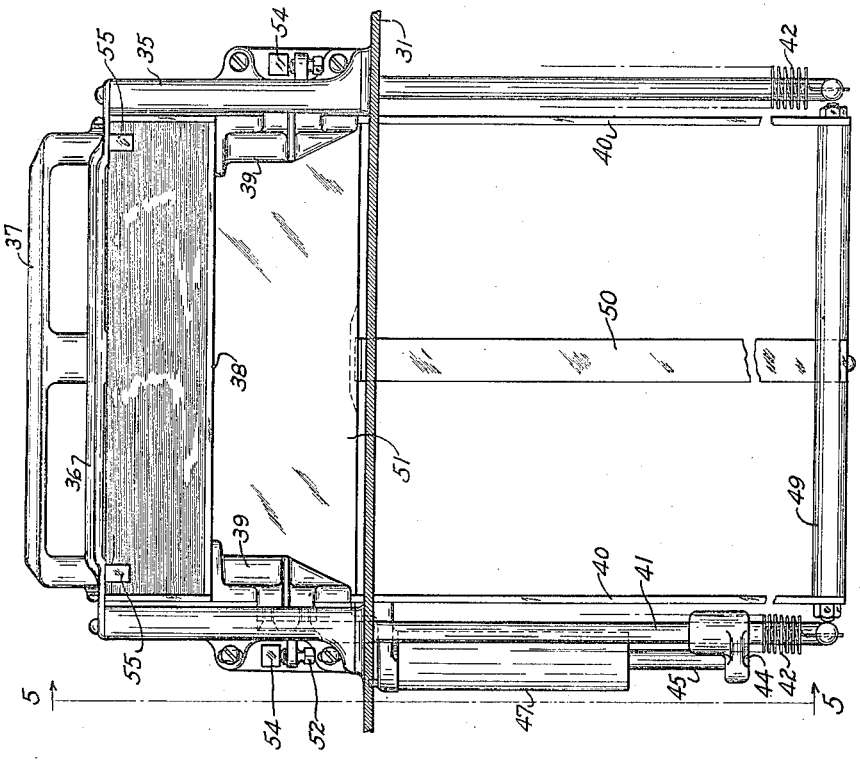
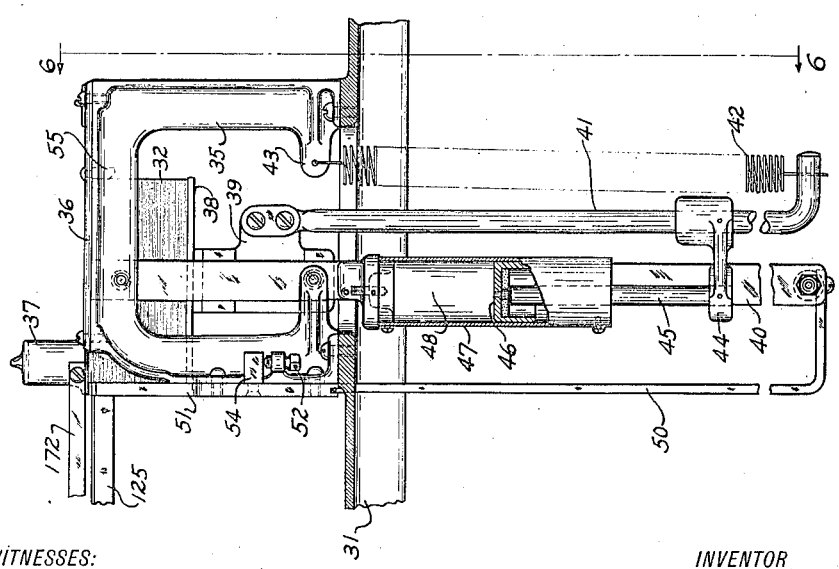
WITNESSES:
Robert B. Jordan
Josephine Gasper
INVENTOR
Charles A. Tripp
BY
Hood Schley.
ATTORNEY Sept. 22, 1931.　　　　C. A. TRIPP　　　　1,824,581
PUNCHED CARD ACCOUNTING MACHINE
Filed June 9, 1917　　　12 Sheets-Sheet 5
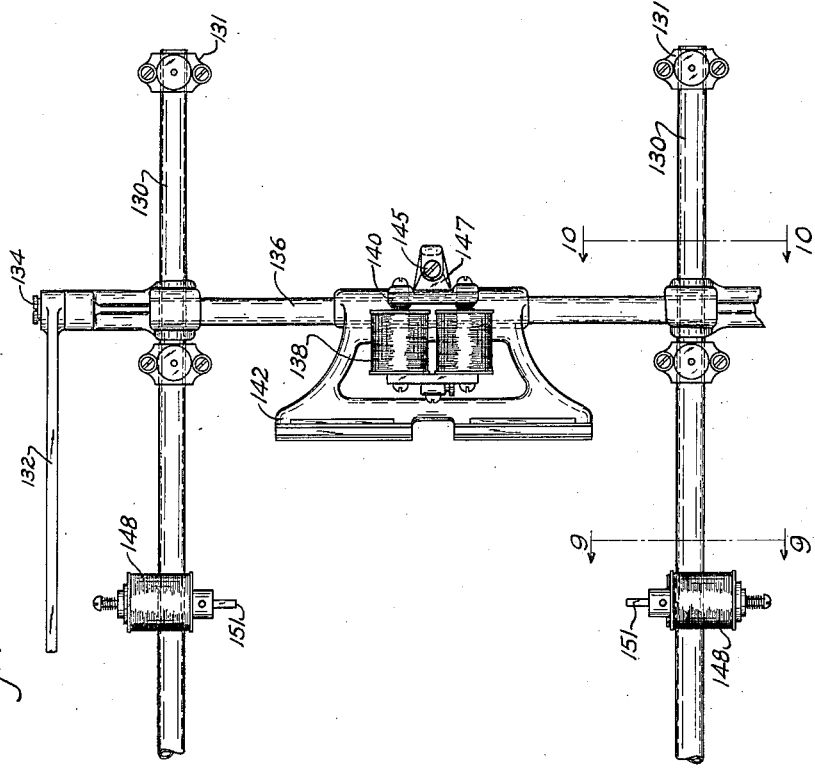
WITNESSES:
Robert B. Jordan
Josephine Gasper
INVENTOR
Charles A. Tripp
BY
Hood & Schley
ATTORNEY Sept. 22, 1931.                     C. A. TRIPP                         1,824,581
                         PUNCHED CARD ACCOUNTING MACHINE
                              Filed June 9, 1917            12 Sheets-Sheet 6
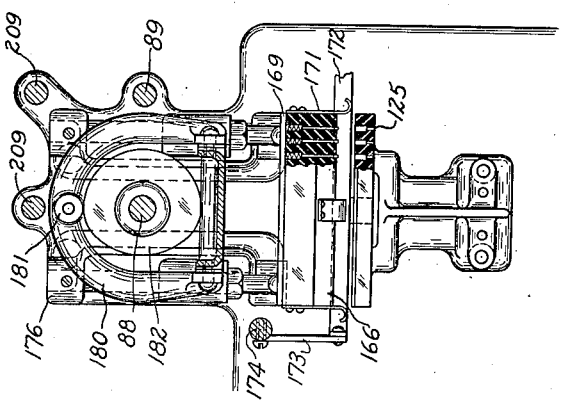
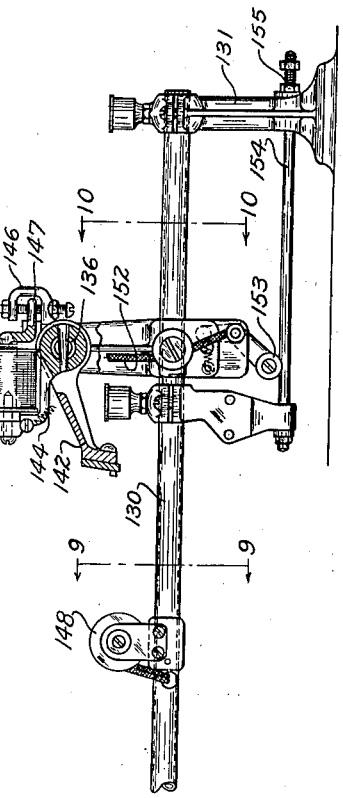
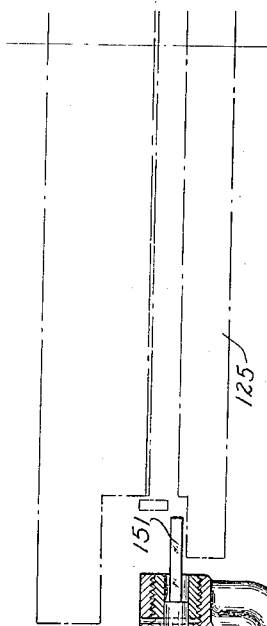
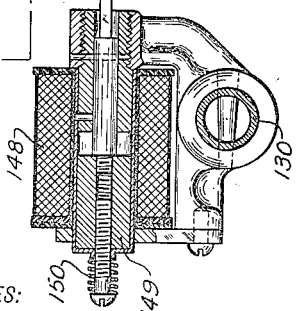
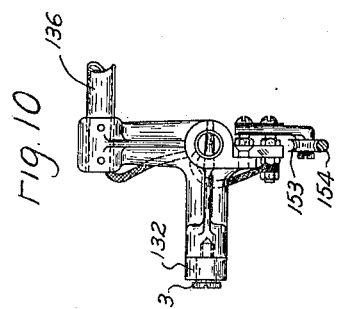
WITNESSES:                                        INVENTOR
Robert B. Jordan                                  Charles A. Tripp
Josephine Gasjer                                  BY
                                                  Hood & Ashby
                                                      ATTORNEY Sept. 22, 1931.  C. A. TRIPP  1,824,581
PUNCHED CARD ACCOUNTING MACHINE
Filed June 9, 1917  12 Sheets-Sheet 7

WITNESSES:
Robert B. Jordan
Josephine Gasper

INVENTOR
Charles A. Tripp
BY
Hood & Schley
ATTORNEY

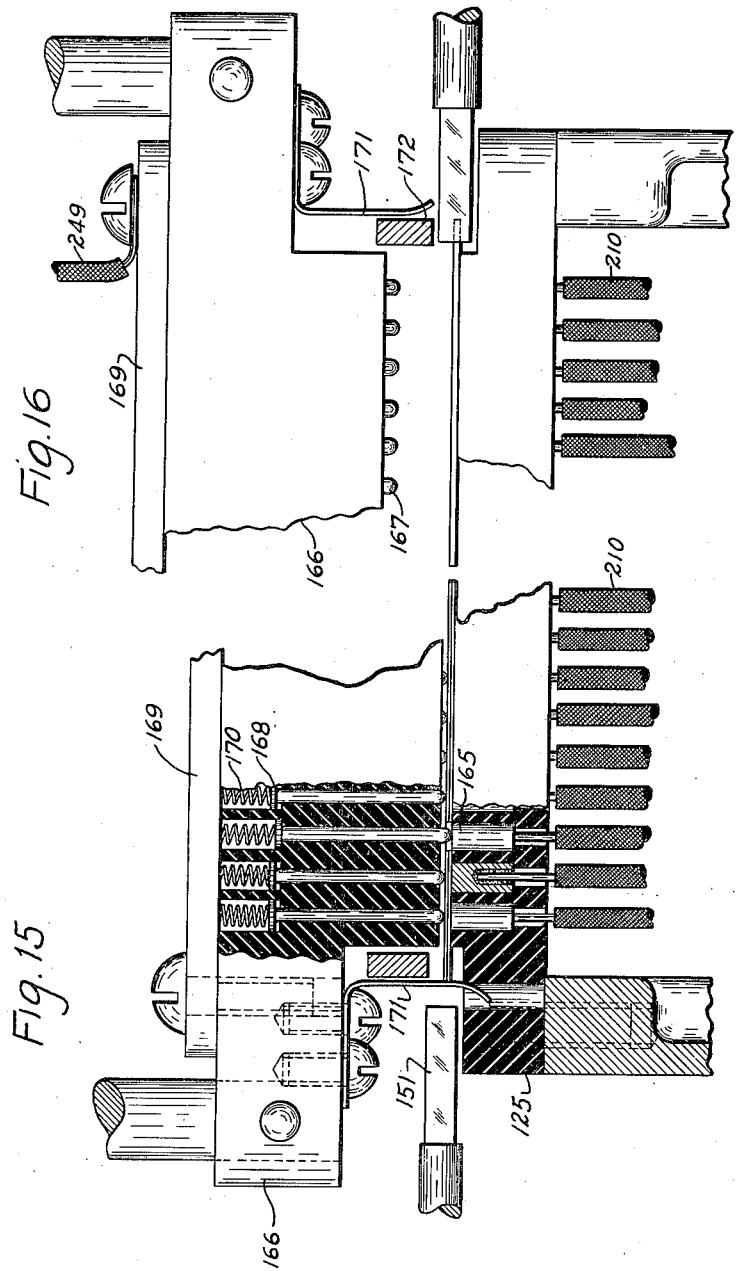

Sept. 22, 1931.　　　　　C. A. TRIPP　　　　　1,824,581
PUNCHED CARD ACCOUNTING MACHINE
Filed June 9, 1917　　　12 Sheets-Sheet 9

WITNESSES:
Robert B. Jordan
Josephine Gasper

INVENTOR
Charles A. Tripp
BY
Hood & Achby
ATTORNEY

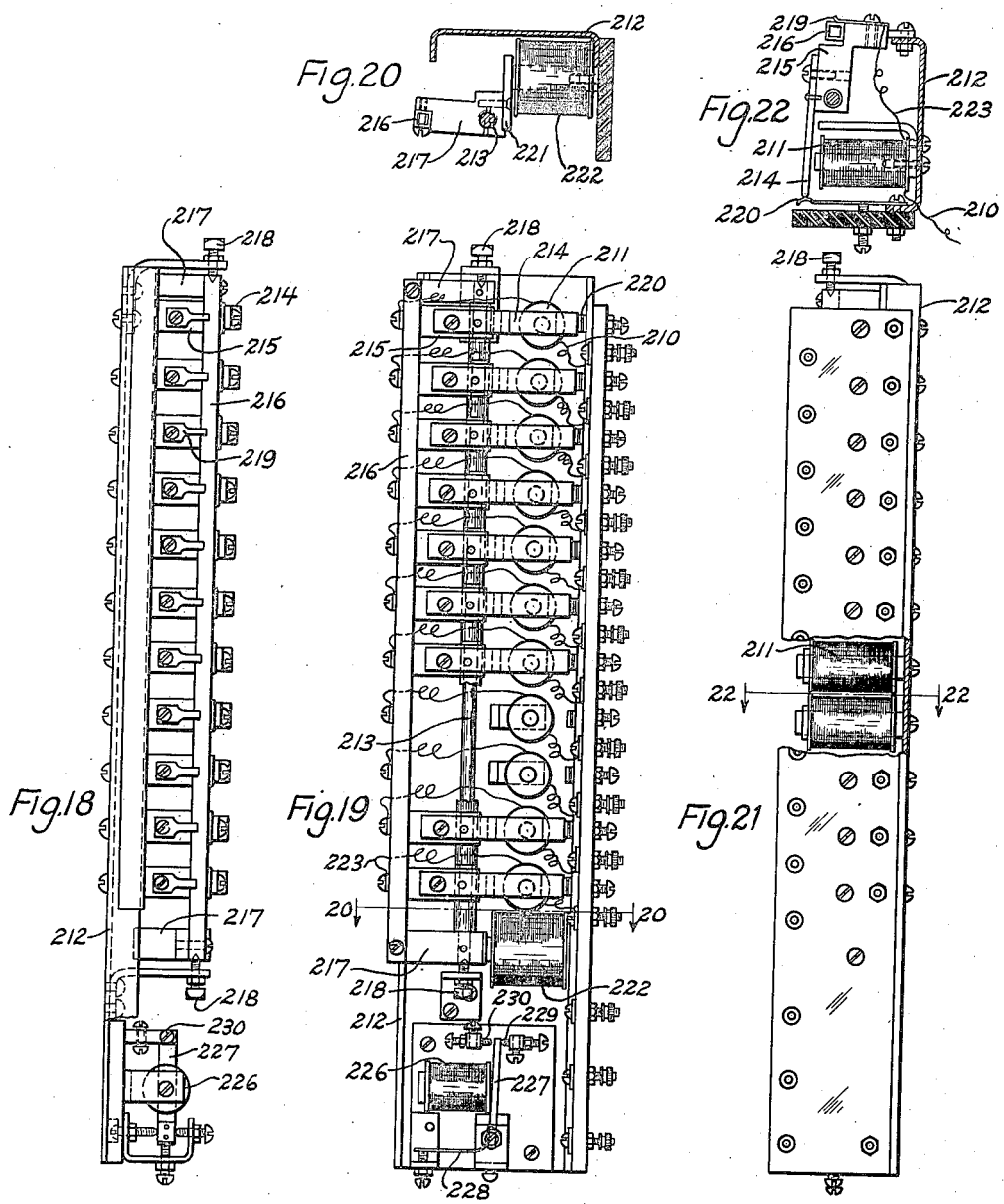
Sept. 22, 1931. C. A. TRIPP 1,824,581
PUNCHED CARD ACCOUNTING MACHINE
Filed June 9, 1917 12 Sheets-Sheet 10
INVENTOR
Charles A. Tripp Sept. 22, 1931. C. A. TRIPP 1,824,581
PUNCHED CARD ACCOUNTING MACHINE
Filed June 9, 1917   12 Sheets-Sheet 11
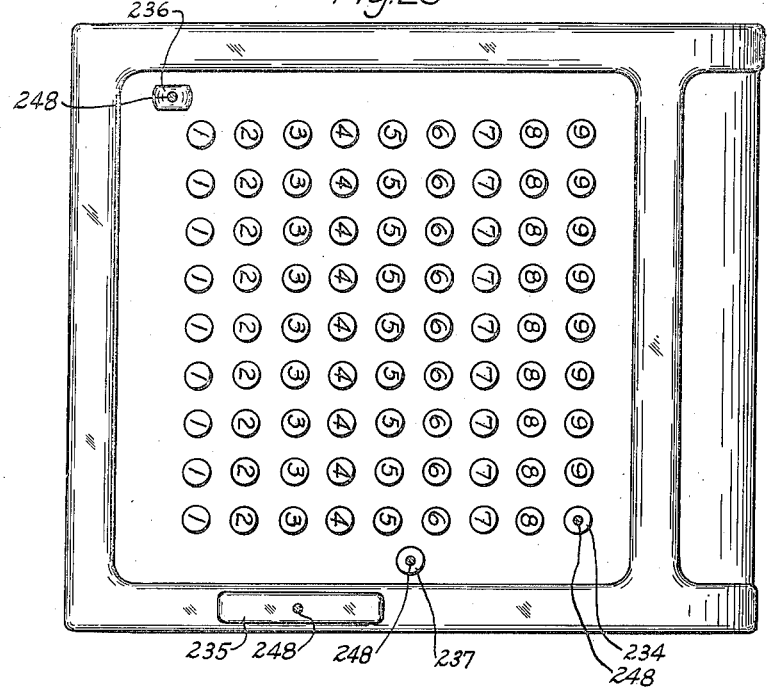
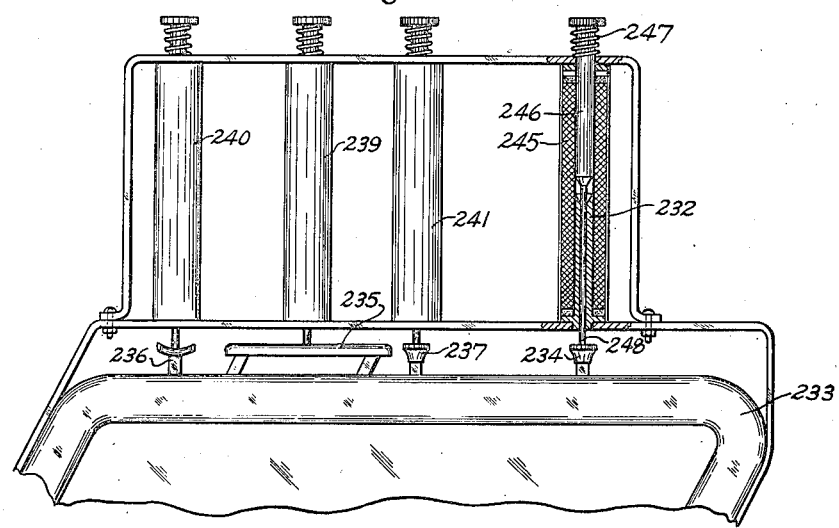
WITNESSES:
Robert B. Jordan
Josephine Gasper
INVENTOR
Charles A. Tripp.
BY
Hood & Schley.
ATTORNEY Sept. 22, 1931.   C. A. TRIPP   1,824,581
PUNCHED CARD ACCOUNTING MACHINE
Filed June 9, 1917   12 Sheets-Sheet 12
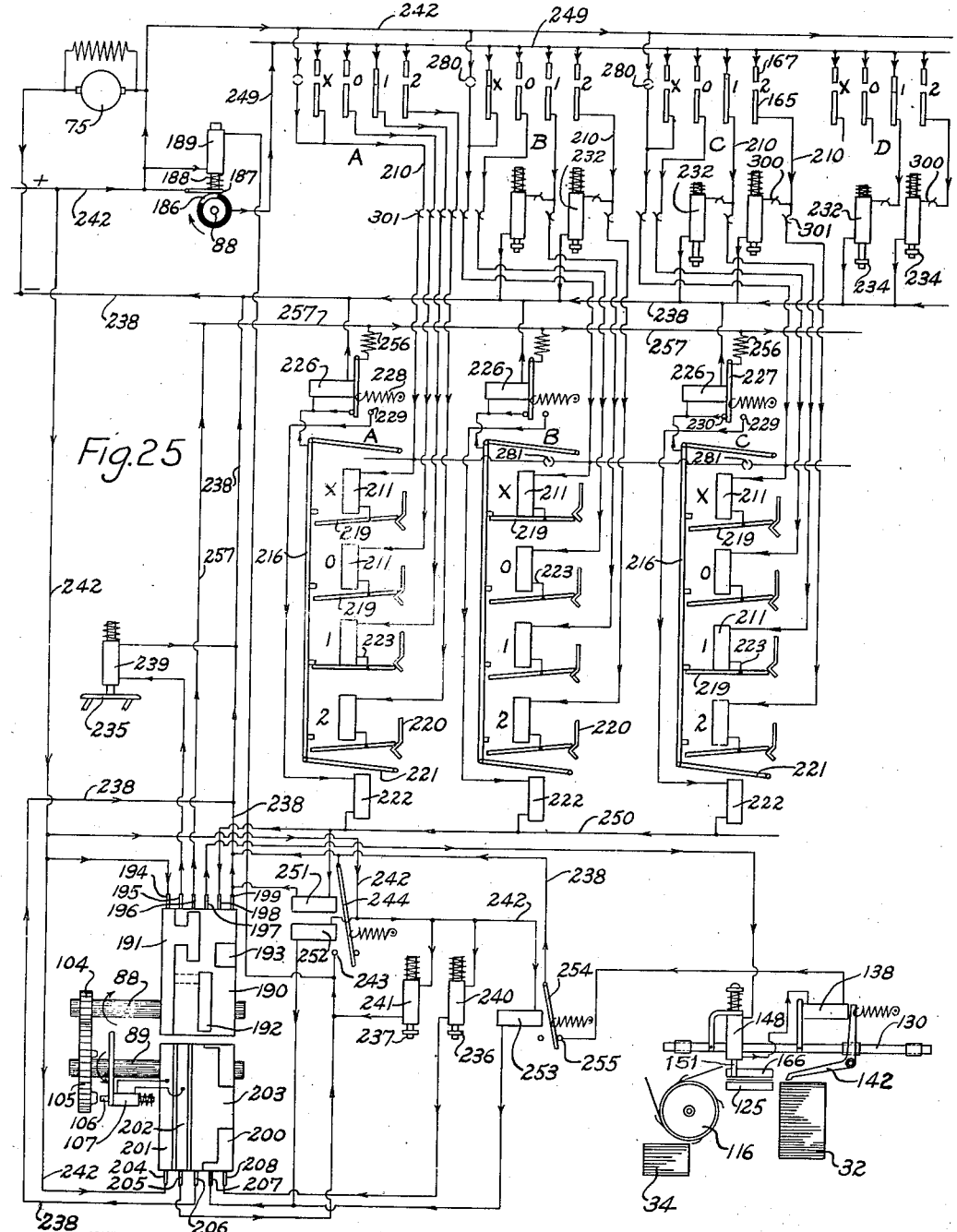

Patented Sept. 22, 1931

1,824,581

UNITED STATES PATENT OFFICE

CHARLES A. TRIPP, OF INDIANAPOLIS, INDIANA, ASSIGNOR, BY MESNE ASSIGNMENTS, TO THE TABULATING MACHINE COMPANY, OF NEW YORK, N. Y., A CORPORATION OF NEW JERSEY

PUNCHED CARD ACCOUNTING MACHINE

Application filed June 9, 1917. Serial No. 173,760.

In keeping complicated records, and in auditing such records, as for instance in census work and in railway accounting work, there is a growing use of the punched card system, wherein there is a card for each individual item of record, such as a person in census work or a single freight shipment in railway accounting work, and holes or groups of holes are punched in different locations on such card to denote the different characteristics of the particular item of which a record is kept on that card. These hole locations are usually arranged in columns, and a column or a group or "field" of associated columns is used to record a particular characteristic of the item, usually on the decimal system. Thus, for instance, a railroad will give different commodities arbitrary numbers, and if the total number of commodities does not exceed 999 three columns will be sufficient to take care of the commodity characterization, by different punchings of the digit hole locations in these columns. Also, each column may have one or more additional hole locations, for supervisory control; for instance, sometimes some particular characteristic will not be recorded, so that none of the digit hole locations in the "field" in which a record of that characteristic is kept will be punched. Instead, an "X" hole is punched, denoting that no record is made in the "field" controlled by such "X" hole. The groupings of the columns for different card systems will be different, of course.

Machines have been devised and are in successful use for sorting these cards according to any desired grouping, for counting the cards in the various groups, and for adding the amounts given by any desired column or "field" of columns as indicated by the punchings in the cards of the individual groups. These sorting machines arrange the cards in groups according to any desired classification. In the past it has been necessary to separate the cards of one group from those of another by "stop cards", which are usually blank (at least in the tabulated portions), for the machines for counting or adding have heretofore required such stop or division cards in order to stop the counting or adding operation at the end of each group, so that the total or sub-total may be read off or recorded, and the counting or adding device, if desired, set back to zero for starting on the next group of cards.

Prior to the invention set forth in my Patent No. 1,208,051, granted December 12, 1916, it had always been necessary, so far as I am aware, to insert these "stop cards" by hand— a tedious operation requiring considerable skill and care in the "needling" operation by which the groups are separated. In such patent I have shown a machine for inserting such stop cards automatically, whenever there is a change in the punching in any desired "field" or combination of "fields" as the punched cards are fed successively through the machine.

It is the object of my present invention to do away entirely with the necessity for stop cards, and to count cards in the various groups or add the amounts indicated by the punchings in any "field" or in a number of "fields" separately in the different groups of cards, thus saving two operations—that of inserting the stop cards and that of removing them later.

In carrying out my invention, I use a machine which in many respects is identical with the stop card inserting machine shown in my aforesaid patent, and which involves many of the same features of invention, as covered by the claims of such patent. However, I eliminate the "stop card" feeding part of the machine shown in such prior patent, and combine with the remainder any suitable type of adding machine and electro-magnetic means for operating the different keys and levers of such adding machine—such as the amount keys, the accumulating key, the error key, and the totalizing key—controlling such electro-magnetic means either separately or jointly with the selecting devices of the machine shown in such patent by the contacts of a control plate and by a commutator in the same general way as such control plate and commutator control the selecting means in the machine shown in such patent.

Briefly, in the preferred form of my invention, the sorted punched cards are arranged in a pile in one part of the machine, for feeding therethrough, and the discharged cards which have been fed through the machine one at a time are arranged in the same order in another pile; and a reciprocating feeding device is arranged to operate on the first pile to feed the cards therefrom successively on to a control plate and thence to the discharge mechanism, which deposits them on the second pile; and means co-operates with this control plate through the holes in the card on the control plate during the time it remains there for controlling electro-magnetic relay devices, which in turn, preferably in conjunction with a commutator which operates synchronously with the feeding mechanism, control the feeding mechanism and cause it to become temporarily inoperative on the pile of punched cards and on the card on the control plate when the controlling punchings in any card on the control plate differ in any way from those in the preceding card thereon, and for controlling, also in conjunction with a commutator, the electro-magnetic devices which operate the various keys of the adding machine.

In doing this, I have arranged a commutator through which the current to the control plate is supplied, and have so timed the movements of this commutator and of the contact means co-operating with the control plate through the holes in the card that no circuits are ever made or broken at the control plate. By this means I completely avoid all arcing at the contact plate, so that the contacts thereof and the contacts which co-operate with them are free from spark corrosion and last indefinitely—so that on an actual test embodying one hundred and thirty-two thousand (132,000) operations there was not a single failure.

Figure 2:
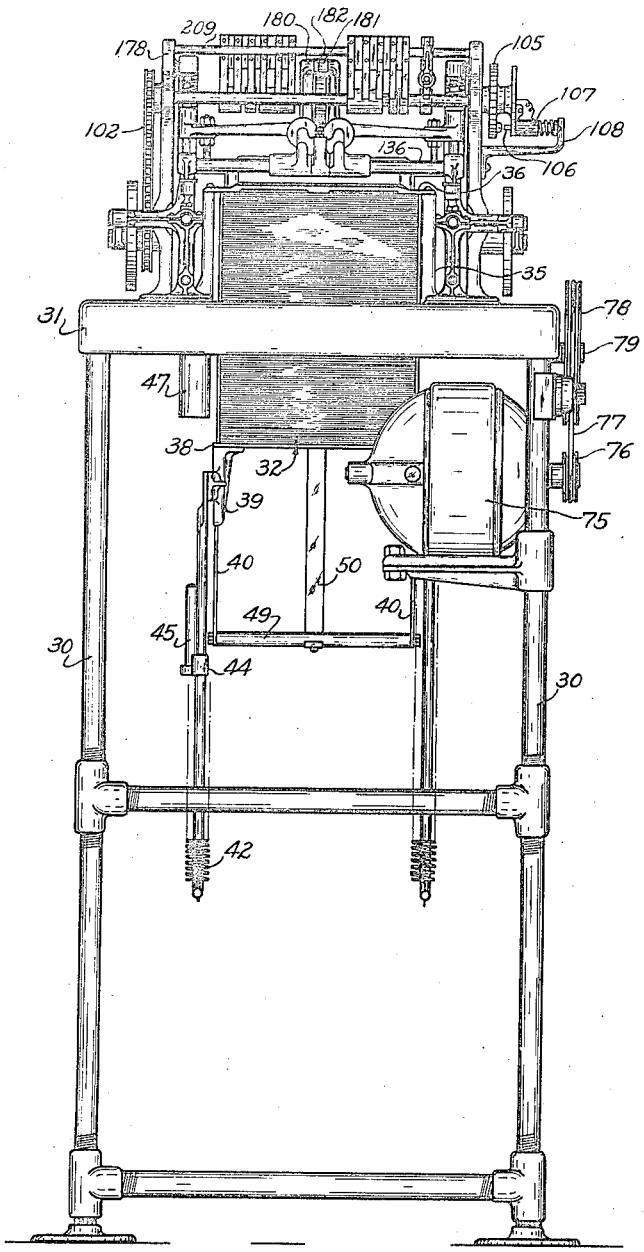
Figure 3:
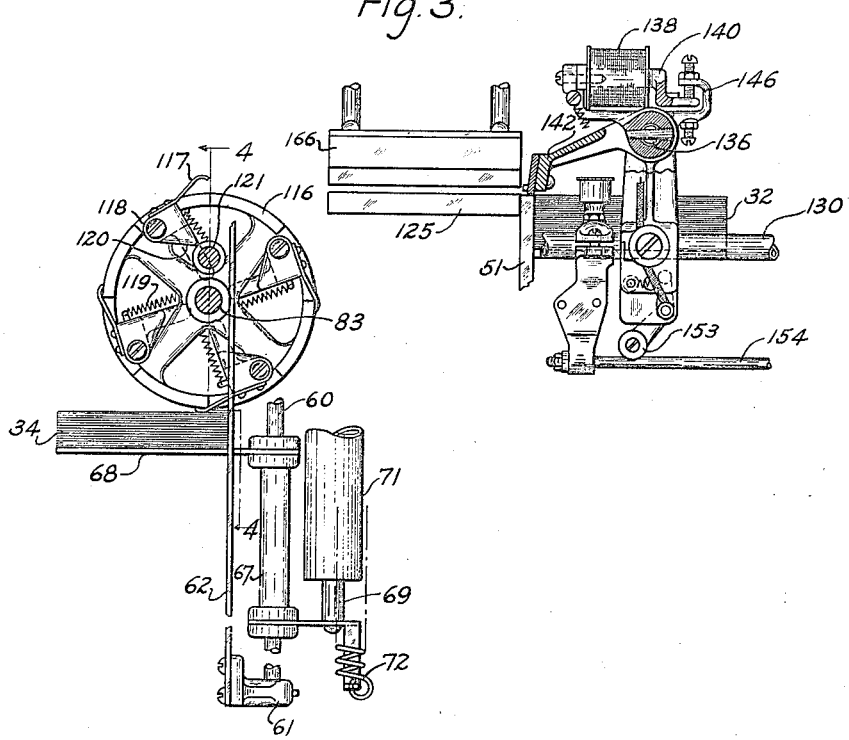
Figure 4:
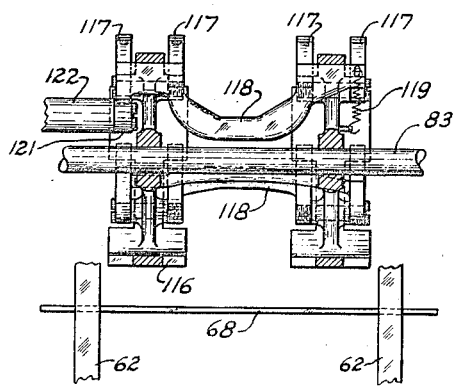
Figure 11:
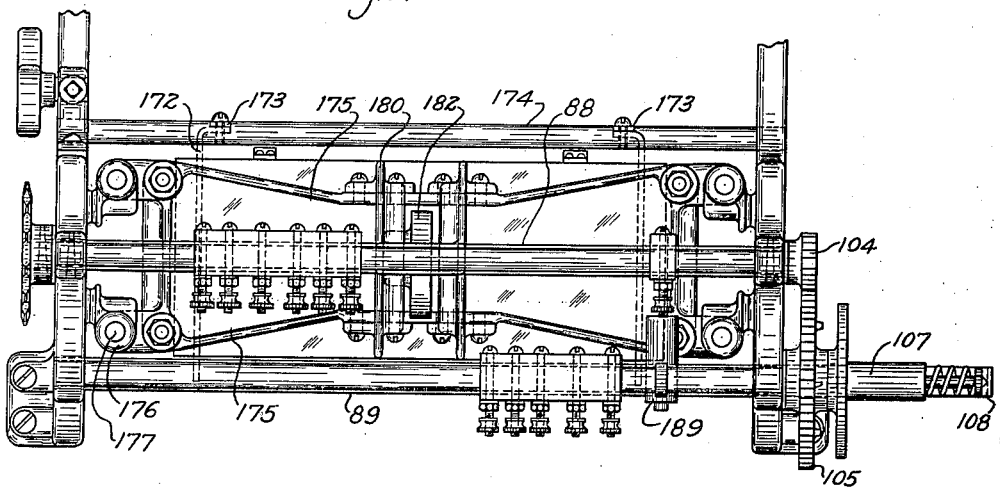
Figure 12:
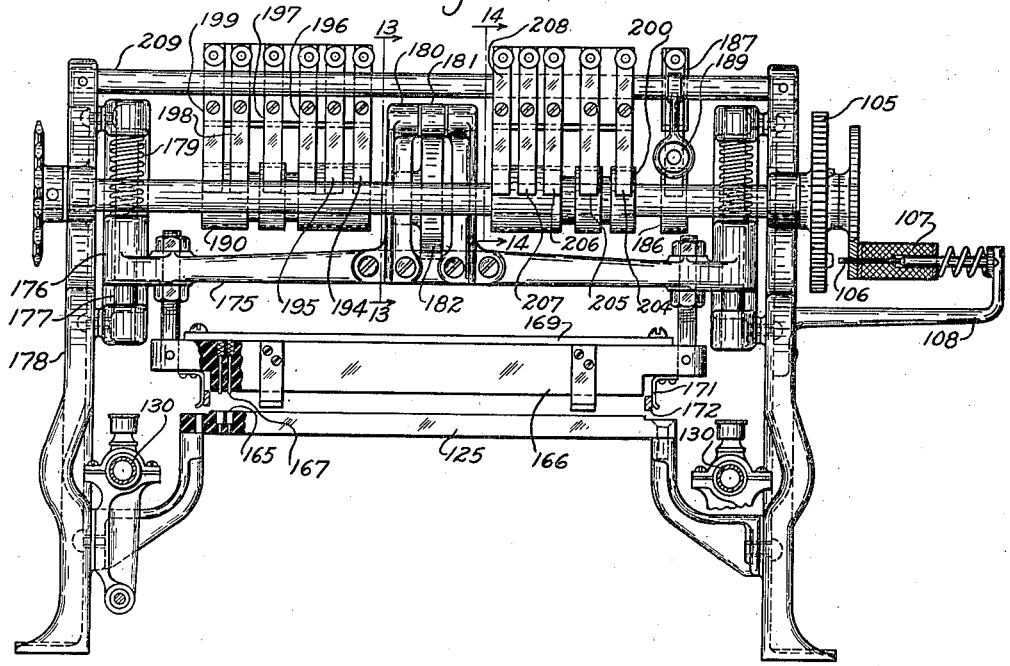
Figure 17:
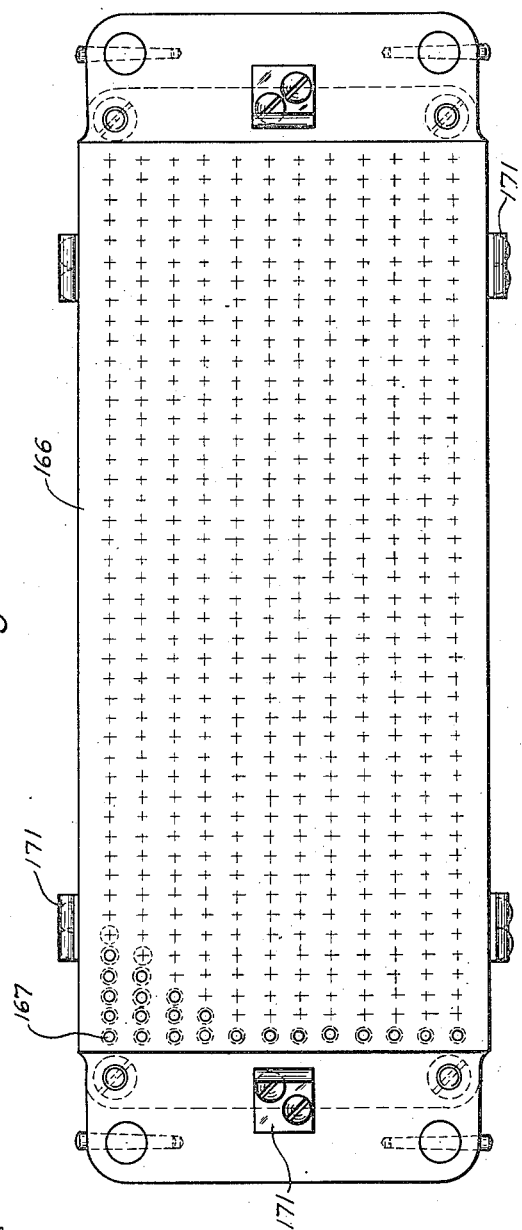

The accompanying drawings illustrate my invention, in its preferred embodiment. In these drawings, Fig. 1 is a front elevation of a punched card accounting machine embodying my invention; Fig. 2 is an end elevation of such machine; Fig. 3 is an enlarged fragmentary detail, showing the discharge mechanism; Fig. 4 is a sectional detail on the line 4—4 of Fig. 3; Fig. 5 is a section on the line 5—5 of Fig. 6, showing the means for supporting the pile of punched cards in position for feeding; Fig. 6 is a section on the line 6—6 of Fig. 5; Fig. 7 is a partial plan view of the feeding mechanism; Fig. 8 is a partial front elevation of the feeding mechanism shown in Fig. 7; Fig. 9 is a section on the lines 9—9 of Figs. 7 and 8, showing a detail of the feeding apparatus for feeding the punched cards from the control plate to the discharge mechanism; Fig. 10 is a section on the lines 10—10 of Figs. 7 and 8; Fig. 11 is a plan view of the controlling commutators; Fig. 12 is an elevation of such commutators, showing their relation to the control plate and the plunger-carrying plate; Fig. 13 is a section on the line 13—13 of Fig. 12; Fig. 14 is a section on the line 14—14 of Fig. 12; Fig. 15 is a fragmentary partial section through the control plate and the plunger-carrying plate, showing the co-operation of the two plates and an interposed card, with the plunger-carrying plate in its lower position; Fig. 16 is a somewhat similar view, showing the other ends of the two plates, in elevation, with the plunger-carrying plate raised; Fig. 17 is a bottom view of the plunger-carrying plate, showing some of the plungers diagrammatically; Fig. 18 is a side elevation of one of the sets of relay devices, corresponding to a column of plungers; Fig. 19 is a front elevation of the relay devices shown in Fig. 18; Fig. 20 is a section on the line 20—20 of Fig. 19; Fig. 21 is a side elevation of such set of relay devices, being taken from the opposite side from Fig. 18; Fig. 22 is a section on the line 22—22 of Fig. 21; Fig. 23 is a plan of the keyboard of an adding machine, showing in section some of the operating rods of the electro-magnetic operating means for the keys; Fig. 24 is a partial side elevation of the keyboard and frame of such adding machine, and of the electro-magnetic operating means, showing one electro-magnetic operating device in section, and omitting all but a few of such devices, for the sake of clearness of illustration; and Fig. 25 is a diagram showing the electrical connections, though for a number of hole locations in each column and for a number of columns which, for simplicity in the diagram, are much smaller than actually used.

The frame of the machine comprises legs 30 and a top plate or table 31, and supports the entire mechanism. The table 31 is provided with supports for two piles of cards, that is, the sorted punched cards 32 near one end of the table, for feeding into the machine, and the discharged cards 34 near the other end of the table, after they have been fed through the machine and discharged therefrom. The top of each pile is maintained at a constant level, the top of the pile 32 being above the table 31, and that of the pile 34 being below such table; the pile 32 may project through the plane of the table. Each pile of cards is carried by a card-supporting mechanism, which maintains the top of the pile at a constant level. In the card-supporting mechanism for the pile 32, there is a pair of end plates 35 attached to the table 31 and located at the ends of the cards 32 and at the ends of a hole through the table 31 for allowing vertical passage of this pile of cards. This pair of end plates 35 supports a top plate 36, which bears against the upper surface of the top card in the pile near the ends thereof and along a line near the middle and parallel with the ends, being cut away intermediately, and at the end toward the center of the table is provided with a bridge 37 which is similarly cut away. The pile of cards rests on a bottom plate 38, which is carried by two sliding members 39 which slide vertically along slide bars 40 supported by the end plates 35 and extending from the upper edge of such end plates down through the opening in the table 31 for a sufficient distance to accommodate a pile of cards of the desired height. The sliding members 39 are provided with ears to which are rigidly attached downwardly extending members 41, the lower ends of which are bent to provide attaching fingers for the lower ends of tension springs 42, the upper ends of which are carried by lugs 43 from the end members 35. One of the downwardly extending members 41 has a lateral finger 44, which carries an upwardly extending rod 45 the upper end of which bears against the piston 46 in a dash pot 47 mounted on the adjacent slide bar 40, such piston being provided with a central hole 48 which is closed by the upper end of the rod 45 when such rod is in engagement with the piston. This dash-pot acts as a cushion to prevent the bottom plate 38 from coming violently into contact with the top plate 36 at any time. The lower ends of the slide bars 40 are connected by a cross bar 49, which is attached to an L-shaped guide bar 50, the upper end of which rests in a slot in the lower edge of a guide plate 51 carried by and vertically adjustable on the edges of the end plates 35 toward the center of the table, this adjustment being provided with adjusting screws 52 carried by lugs on the end plates 35 and bearing against lugs 54 on the guide plate 51. The cards 32 are guided by the slide bars 40, the guide bar 50, and the guide plate 51, and as they approach the top of the pile are also engaged at their rear edges by guide fingers 55 to ensure the alinement of the cards. The adjustment of the guide plate 51 provides for a space between its upper edge and the lower edge of the middle bar of the bridge 37 just sufficient to permit the edgewise passage of a single punched card, which passage is effected by the feeding mechanism hereinafter described.

The supporting mechanism for the card pile 34 is of the same general type. In this card-supporting mechanism, there is a vertical slide rod 60, which at its lower end is provided with a transverse member 61 the ends of which are attached to the lower ends of guide bars 62, the upper ends of said guide bars and said slide rod being suitably supported from the table 31. A slide 67 is mounted on the slide rod 60, for a vertical sliding movement therealong, and is provided with card-supporting plate 68 on which the discharged cards are supported. The slide 67 carries an upwardly extending rod 69, exactly like the rod 45, and co-operating in a similar way with the piston 70 of a dash-pot 71 which is also suitably supported from the table 31. The slide 67 and the card-supporting plate 68 are drawn upward by a tension spring 72. The guide bars 62 are sufficiently close together so as to engage the edge of the card near both ends, and withdraw it from the discharge wheel hereinafter described.

The power for moving the cars through the machine and for operating the various movable parts is provided by a suitable motor 75, which is conveniently mounted below the table 31. A pulley 76 on the side of this motor is connected by a belt 77 to a pulley 78 on a main driving shaft 79, which extends transversely of the machine. Parallel to this shaft 79 are idler shafts 80 and 81, a feed shaft 82, a discharge wheel shaft 83, and main and supplemental commutator shafts 88 and 89. The shafts 82 and 83 are connected, by suitable gearing inter-connecting them directly or mediately through the idler shafts 80 and 81, to the main driving shaft 79. The shaft 82 is connected by a chain 102 and suitable sprockets to the shaft 88. The shafts 88 and 89 are connected through a 3-to-1 reducing gearing 104—105, the gear 105 being loose on the shaft 89 but connectible thereto by any suitable electro-magnetic clutch 106, which may be set by an electro-magnet 107, the plunger of which forms the moving clutch member 106 which when not in clutching position is in position to engage a fixed arm 108 to prevent the movement of the shaft 89. The gear ratios are such that for every revolution of the feed shaft 82, the main commutator shaft makes one revolution, the auxiliary commutator shaft 89 (if the clutch 106 is set) makes one-third ($\frac{1}{3}$) of a revolution, and the discharge wheel shaft 83 makes a suitable fraction of a revolution—as shown, one-fourth ($\frac{1}{4}$).

The discharge wheel shaft 83 carries a discharge wheel 116. This consists of two separated parts, as is clear from Fig. 4, each of which parts is provided around its periphery with a plurality of pivoted spring fingers 117, corresponding fingers 117 of the two parts of the discharge wheel being connected by yokes 118 so that the two corresponding fingers 117 on the two parts may be drawn inward by a tension spring 119 connected to the fingers on one of such parts and may be forced outward by cam surfaces 120 on the fingers on the other of such parts. The cam surfaces 120 co-operate with a cam roller 121 carried by a fixed finger 122 suitably supported on the table 31, so that as the shaft 83 rotates the fingers 117 are successively forced outward as they pass the high point of their movement, so as to receive the edge of a card discharged (by mechanism hereinafter described) horizontally on to and tangent with the discharge wheel at the high point of its movement, and then are drawn inward by the springs 119 to grip the edge of such card and carry the card through 180° of movement of the shaft 83, or from the high to the low point of the movement of the discharge wheel, until the edge of the card strikes the guide bars 62 and such guide bars stop the card and draw it out of the grasp of the fingers 117, leaving it on the top of the pile of discharged cards 34.

The card pile 32 is located to the right (Figs. 1 and 25) of the discharge wheel 116, at a distance therefrom somewhat greater than the width of a card, thus leaving a space for a control member 125, which I prefer to make as a flat plate the upper surface of which is in the horizontal plane of the top card of the pile 32 so that such top card can be slid on to such control plate and thence from the control plate horizontally on to the discharge wheel 116, with the high point of which the plane of such control plate is substantially tangent.

The feeding of the cards is accomplished by a reciprocating feeding mechanism such as shown in detail in Figs. 7, 8, 9. and 10. This feeding mechanism is carried by a reciprocating frame 130, which is mounted in brackets 131 suitably supported on the table 31. A pair of connecting rods 132 join pivot pins on the end of this frame and crank pins 134 on crank wheels 135 on the feed shaft 82, so that the reciprocating frame makes one complete reciprocation for each rotation of such shaft and for each rotation of the commutator shaft 88. The frame 130 is provided near its right hand end (Figs. 7 and 8) with a tubular cross bar 136 which is slightly higher than the body of the reciprocating frame. This cross bar has fixed thereon an electro-magnet 138, the armature 140 of which is carried by a pivoted feed finger 142 pivotally mounted on the rod 136. The feed finger 142 is drawn upwards by a spring 144, but is pulled downward against the action of such spring when the armature 140 is attracted by the electro-magnet 138. The movement of the feed finger 142 may be adjusted by screws 145, carried by a fixed arm 146 on the rod 136, which screws act on opposite sides of a finger 147 projecting from the armature 140. The feed finger 142 is bifurcated, as is clear from Fig. 7, so that it may pass under the bridge 37 on either side of the middle arm thereof. The feed finger 142, when depressed by the energization of its operating magnet 138, acts on the rear edge of the top card 32' of the card pile 32 to force such top card 32' to the left (Figs. 1, 7, and 8) on to the control plate 125 as the frame 130 is moved on its leftward stroke. The longitudinal bars of the frame 130 have fixed thereon solenoids 148, the cores 149 of which are horizontally slidable, transversely of the movement of the reciprocating frame 130. These cores 149 are spring-pressed outwardly by springs 150, and are provided with nonmagnetic extensions 151 which when the cores 149 are drawn inward by the magnetization of the solenoids are projected inwardly past the rear corners of the card on the control plate 125 so that when the reciprocating frame 130 moves to the left such extensions 151 force the card on the control plate from the control plate and on to the discharge wheel 116 and also act as stops acting on the front corners of the card being fed from the pile 32 on to the control plate to limit the forward movement of such card under the action of the feed finger 142. The two solenoids 148 and the electro-magnet 138 are connected in series, conveniently by wires 152 which pass through the tubular members of the frame 130, and the ends of the wires 152 are connected to trolley wheels 153 which travel in fixed wires 154 carried by the brackets 131 and suitably insulated therefrom, the ends of these trolley wires being provided with binding posts 155. The solenoids 148 and the electro-magnet 138, when energized, are energized during the movement of the reciprocating frame 130 to the left, such energization being accomplished by mechanism hereinafter described.

The control plate 125 is of insulating material, suitably stationarily supported, and fixed in this insulating plate are any desired number of contacts 165, the upper surfaces of which are flush with the upper surface of the plate. These contacts 165 are connected as hereinafter described. The contacts 165 are usually arranged in groups or columns, with any desired number of columns, and usually with nine or more contacts in a column when the decimal system is used. Co-operating with the control plate 125 is a vertically reciprocating plunger plate 166, which is also of insulating material and which carries a plurality of plungers 167, which normally project downward slightly beyond the lower surface of the plunger plate 166 and are provided with heads 168 between which and a cover plate 169 covering the entire set of plunger holes are located springs 170, one for each plunger, for pressing such plungers downward. The heads 168 are in enlarged portions at the top of the plunger holes in the plate 166, the shoulders formed by the bottoms of such enlarged portions co-operating with the heads 168 to limit the downward movement of the plungers. The plate 169 is preferably a metal plate, which electrically connects all the plungers 167 in common. There is one plunger 167 for each of the contacts 165, the plunger and its associated contact being in vertical alinement. When the plunger plate 166 descends, with one of the punched cards 32' on the control plate 125, the plungers 167 which are not opposite holes in such card are raised in the plunger plate 166, and are prevented from engaging their associated contacts 165, by the interposed card; but the plungers 167 which are opposite holes in such card pass through such holes and engage their associated contacts 165 to close breaks in certain electric circuits, though they do not complete such circuits directly; the making and breaking of these circuits occur elsewhere than at these contacts, by mechanism hereinafter described. The plunger plate 166 carries guide fingers 171, which act on the sides and ends of the card on the control plate 125 to position such card, the guide fingers at the ends of the card passing down outside of horizontal guide rods 172, which are located over the cards near their ends to keep the cards from buckling as they pass on to the control plate. The guide rods 172 are fastened at one end to the bridge 37, and at the other are attached to depending fingers 173 carried by a fixed transverse bar 174. The plunger plate 166 is adjustably mounted on a frame 175, which is provided with perforated slide lugs 176 mounted on slide rods 177 suitably mounted in a superstructure 178 carried by the table 31. Compression springs 179 surround the slide rods 177 above the lugs 176, and tend to force the frame 175 and plunger plate 166 downward. The frame 175 is provided with a yoke 180, which extends over the main commutator shaft 88 and is provided with a roller 181 which rides on a cam 182 fixed on such main commutator shaft 88, so that at each rotation of the main commutator shaft 88, which rotates at the same angular speed as does the feed shaft 82, the frame 175 and the plunger plate 166 make a complete vertical reciprocation. Thus the rate of reciprocation of the plunger plate 166 is the same as that of the horizontally reciprocating frame 130. However, the vertically reciprocating plunger plate 166 descends to its lowermost position and then rises to its uppermost position, thus making a complete reciprocation, practically wholly during the movement of the horizontally reciprocating frame 130 to the right (Figs. 1, 8, and 25).

The main commutator shaft 88 carries a main commutator segment 186 with which co-operates a pivoted brush 187 which is spring-pressed into engagement with the segment 186 by a spring 188, but may be lifted out of engagement therewith by a solenoid 189. It also carries a drum 190 on which are commutator segments 191, 192, and 193, which co-operate with spring contact fingers 194, 195, 196, 197, 198, and 199, in the manner indicated in the development in the lower left hand corner of Fig. 25. The segments 191 and 192 are interconnected as shown.

The auxiliary commutator shaft 89 carries a drum 200 on which are commutator segments 201, 202, and 203, which co-operate with spring contact fingers 204, 205, 206, 207, and 208, in the manner indicated in the development in the lower left hand corner of Fig. 25. The spring contact fingers 194 to 199 or 204 to 208 associated with each drum 190 or 200 are carried by a fixed transverse rod 209, of which there is one for each drum, and each of such fingers is provided with a suitable binding post (see Fig. 14).

Each contact 165 in the control plate 125 is connected to a wire 210, which may lead either to a selecting magnet 211 of a corresponding group of selecting magnets or to an amount-setting magnet 232 for operating an amount-setting key of an adding machine, or to both, as indicated diagrammatically in Fig. 25 for the left hand set of contacts 165, the right hand set of contacts 165, and the two middle sets of contacts 165, respectively. The selecting magnets 211 are arranged in groups, corresponding to those columns of the contacts 165 which it is desired shall have a selective control, and in each group of magnets 211 there is one magnet for each contact 165 of the corresponding group of contacts. The amount-setting magnets 232 are arranged in similar groups. The relations of the groups of amount-setting magnets and of the groups of selecting magnets to the groups of contacts 165 may be varied by jacks 300 and 301, conveniently group jacks. The magnets 211 of each group of selecting magnets are mounted in a row in a frame 212. Along this frame extends a rod 213 on which are mounted a plurality of armatures 214, one for each magnet 211, such armatures being separately rotatable on such rod. Conveniently, the armatures 214 are mounted on insulating blocks 215, which are in turn loosely mounted on the rod 213, and the rear ends of these blocks 215 are notched to receive a square bar 216 which is carried at its ends by two bars 217 which are pinned to the rod 213, such rod being rotatably mounted on pivot pins 218. Each block 215 also carries a contact finger 219, which normally engages the bar 216 (as is apparent from Fig. 22), but which may be disengaged from such bar when the latter is swung in a counter-clockwise direction (Fig. 22) relative to the block 215 carrying such finger 219. The ends of the armatures 214 engage hooked leaf springs 220, which act to hold such armatures in either position in which they are put. One of the bars 217 carries an armature 221 for a magnet 222, which acts to turn the rod 213 and the bar 216 in a clockwise direction (Figs. 20 and 22). The magnets 211 act to turn their individual armatures in a counter-clockwise direction, and to carry the rod 213 and bar 216 with any one of them which is so turned. Thus when any magnet 211 is energized, it attracts its armature 214 and turns such armature in a counterclockwise direction (Fig. 22), thus also moving the rod 213 and bar 216 in such counterclockwise direction and disengaging the bar 216 from all the contact fingers 219 except the one which is carried by the block 215 associated with that one of the magnets 211 which is energized. Each finger 219 is connected by a wire 223 with the opposite terminal of the associated magnet 211 from that which is connected to the wire 210, so that this movement of the bar 216 disconnects all the magnets 211 of that particular group save the one which was energized to produce such movement. In each frame 212 there is also a magnet 226, which has a current-carrying armature 227 which is normally pressed by a spring 228 against a contact 229 but may be drawn away from such contact 229 and into engagement with a contact 230 when the magnet 226 is energized. The various groups of magnets, of which there may be forty-five with twelve in a column when a plunger plate of the size shown in Fig. 19 is used, if it is desired that every column shall have selective control, are carried in a suitable container or containers 231 located within the space within the legs 30 of the main frame, these containers being indicated in dot and dash lines in Fig. 1. The number of magnets in a column may be anything desired, columns of eleven being shown in Figs. 18 to 22. If less than all of the columns of contacts 165 are intended to have a selective control, there may be fewer groups of selecting magnets than there are columns of contacts, as indicated diagrammatically in Fig. 25.

The adding machine or machines with which my machine is associated may be of any desired type, with amount, accumulating, totalizing, and error keys. As shown in Figs. 23 and 24, each such adding machine is indicated as a well-known Burroughs adding machine 233, having nine columns of amount keys 234, an accumulating key or lever 235, a totalizing key 236, and an error key 237. Each amount key 234 in all or any desired number of the columns of keys is provided with one of the amount-setting magnets 232, one terminal of which is connected to the negative bus wire 238 and the other terminal of which is connected to the proper one of the wires 210, so that any key 234 in any column corresponds to the proper contact 165 in the row of contacts to which such column of keys corresponds. The correspondence between any particular column of keys with the contacts is not necessarily fixed to any particular column of contacts, for changes may be desired when different systems of punchings in the cards are used or when different tabulations are being made up from the same sets of cards. Such change may be obtained by connecting jacks 300. The accumulating key or lever 235 is provided with an operating magnet 239, one terminal of which is connected to the negative bus wire 238 and the other to the contact finger 195. The totalizing and error keys 236 and 237 are provided with operating magnets 240 and 241 respectively, one terminal of each of these magnets being connected to the positive bus wire 242. The other terminal of the totalizing magnet 240 is connected to the contact finger 208. The other terminal of the error magnet 241 is connected to the contact point 243 of a normally open switch 244 the swinging lever of which is connected to the negative bus wire 238.

Each of the operating magnets 232, 239, 240, and 241 for the adding machine keys is of the character shown in Fig. 24, comprising a solenoid 245 with a sliding core 246 which is normally spring-pressed upward by a spring 247, but which when the associated solenoid is energized is drawn downward so that a downwardly extending rod 248 therefrom bearing on the associated key depresses the latter to produce the desired operation. In Fig. 24, only one magnet 232 and one amount key 234 are shown, to avoid complexity in the showing.

The general system of connections is shown in Fig. 25. One terminal of the brush-lifting solenoid 189 is connected to the positive bus wire 242, and the other terminal thereof is connected to the contact point 243 of the switch 244. The positive bus wire 242 is also connected to the brush 187 and the contact fingers 194 and 204. The negative bus wire 238 is connected to the contact fingers 199 and 206. The main commutator segment 186 is connected to a plunger bus wire 249, to which the plunger plate 166 and all the plungers 167 are connected. One terminal of each control magnet 226 is connected to the negative bus wire 238, and the other is connected both to the bar 216 and the contact 230 of the associated column of selecting magnets. The armatures 227 of all the control magnets 226 are connected through resistances 256 to a control bus wire 257, which is connected to the contact finger 196. Each contact 229 is connected to one terminal of the re-setting magnet 222 of the associated group of selecting magnets, the other terminals of all these re-setting magnets being connected to a re-setting bus wire 250, which is connected both to the spring contact 198 and to one terminal of a high resistance setting magnet 251 for the switch 244, the other terminal of such setting magnet 251 being connected both to the contact finger 199 and the negative bus wire 238. Thus the high resistance magnet 251 is short-circuited when the commutator segment 193 bridges the contact fingers 198 and 199. The resistance of the high resistance magnet 251 is such that the re-setting magnets 222 are not energized sufficiently strongly to produce a re-setting operation until such short-circuiting of the high resistance magnet 251 occurs. The contact 243 of this switch 244 is also connected to the contact finger 205, so that when the switch is closed the clutch coil 107 is energized, such clutch coil being connected between the two continuous contact rings 201 and 202 on the drum 200 on the auxiliary commutator shaft 89. The switch 244 also has a holding magnet 252, one terminal of which is connected to the positive bus wire 242 and the other terminal of which is connected to the spring contact finger 207. The operating magnet 253 of a normally closed switch 254 is connected in the same way as is the holding magnet 252 of the switch 244, the magnets 252 and 253 being shown connected in shunt to each other. The switch 254 is connected to the negative bus wire 238, and its contact 255 is connected, through the trolley connection described, to one terminal of the feed magnet 138, the other terminal of which is connected to one terminal of the feed solenoids 148, the other terminal of the latter being connected to the contact finger 197. When the magnet 253 is energized to open the switch 254, the circuit for the feed magnet 138 and feed solenoids 148 can thus not be closed. Sometimes it is desirable to cut out a row of contacts 165 and its associated group of contacts, and for this purpose a plug switch 280 is provided for each column of such contacts, one side of such plug switch being connected to the positive bus wire 242 and the other to one of the wires 210 (for the "X" contact) of that particular group. By putting the plug in this switch, a permanent connection is made from such wire 210 to the positive side of the circuit. It is also sometimes desirable that a contact 165 in one column have supervisory control over that column and one or more adjacent columns, which with the first column form a "field" in which a particular characteristic of the item is recorded. For this purpose, this supervisory (or "X") contact, which is the contact to the left in each group of contacts in Fig. 25, has its associated wire 210 connectible by a plug switch 281 to the wire 210 of the corresponding column of contacts of each adjacent column of contacts, whereby these corresponding wires 210 of any desired number of adjacent columns may be connected in parallel to the single supervisory contact 165 of any of such columns.

The operation is as follows:

The sorted punched or record cards are put in the pile 32. As these cards are fed through the machine, more cards are placed at the bottom of the pile. The motor 75 drives the various parts, and causes the discharge wheel 116 to make one-fourth (¼) of a rotation, the commutator shaft 88 and the parts carried thereby to make one rotation, the commutator shaft 89 (when the clutch coil 107 is energized) and the parts carried thereby to make one-third (⅓) of a rotation, and the vertically reciprocating plunger plate 166 to make one complete reciprocation, for each horizontal reciprocation of the frame 130; and causes the feed fingers on such horizontally reciprocating frame 130 to feed one card from the pile 32 on to the control plate 125 and one card from the control plate 125 into the discharge wheel 116 on each reciprocation (as the frame 130 moves to the left) save when the clutch coil 107 is energized, during the time of which energization, which continues for three reciprocations of the frame 130, no cards are fed. The diagram in Fig. 25 shows the relative position of the parts when the reciprocating frame 130 is at an intermediate point of its travel when moving to the right, shortly after the plunger plate has reached its lowermost position and immediately after the main switch 187 has made contact with the segment 186 to complete the circuit through the interengaging plungers 167 and contacts 165. As the frame 130 moves back and forth, it will on every movement to the left move the top punched card from the pile 32 on to the control plate 125, and the preceding punched card, if there was one, from the control plate 125 into the discharge wheel 116, if the magnet 138 and the solenoids 148 are energized during such movement, which they will be save when the auxiliary commutator on the shaft 89 is moving.

Assume that the machine has already been in operation, and that during the preceding movement of the frame 130 to the left a punched card from the pile 32 has been moved on to the control plate 125. In consequence, the plunger plate 166, which has descended from its uppermost to its lowermost position by the action of the springs 179 and the cam 182 during the just completed portion of the movement of the frame 130, has encountered the card which is resting on the control plate 125, and the several plungers 167 have either been pushed back in their sockets against the action of the springs 170 or have passed through holes in the card to engage the corresponding contacts 165 in the control plate 125, according as they have come opposite unperforated or perforated parts of the card respectively. In the simplified diagram of Fig. 25, the contacts 165 and plungers 167 are shown in the upper part of the figure separately from the control plate 125 and the plunger plate 166 which appear in the lower part. This simplified diagram shows the connections for only four columns of plungers, which may be called columns A, B, C, and D respectively, and for only four plungers in each column, and shows groups of selecting magnets for the plunger columns A, B, and C (indicating but four magnets in a column) and groups of amount-setting magnets 232 for the plunger columns B, C, and D (indicating but two magnets in a column, there being none indicated for either the zero plunger or the "X" or supervisory plunger); and it is assumed that the holes come opposite the third (No. 1) plunger in column A, the first (X) plunger in column B, the third (No. 1) plunger in column C, and the third (No. 1) plunger in column D, so that these four plungers have passed through holes in the card on the control plate 125 and engaged their co-operating contacts 165. This has made possible the completion of circuits corresponding to these engaging contacts and plungers, but has not actually completed the circuits, so that there is no possibility of any arcing upon the engagement of the plungers and contacts, the circuit being open between the brush 187 and contact segment 186. Directly after this engagement of the plungers and contacts by the descent of the plunger plate 166, the continued rotation of the constantly rotating commutator shaft 88 brings the contact segment 186 into engagement with the brush 187, thus completing the circuits which have been prepared for closing by the engagement of plungers and contacts through the holes in the card on the control plate. Tracing this circuit for column C, say, the circuit is from the positive supply wire 242 through the brush 187, the commutator segment 186, the plunger bus wire 249, the cover plate 169, the third (No. 1) plunger 167 in column C (numbering from the left), and the corresponding contact 165, to the corresponding wire 210, whence the circuit branches. One branch is through the corresponding (No. 1) amount-setting magnet 232 (the first in group C counting from the left, for ordinarily there is no zero amount-setting magnet), to the negative bus wire 238. The other branch is through the third (No. 1) selecting magnet 211 (numbering from the top) in the corresponding column C of selecting magnets, the wire 223 from such magnet, the contact finger 219 carried by the armature of such magnet, the bar 216 for the magnet column C, and the control magnet 226 for the magnet column C, to the negative bus wire 238. Similar circuits may be completed for each column of selecting magnets and for each column of amount-setting keys. The third selecting magnet 211 (No. 1) in column A, and the first (X) in column B, are thus also energized, as is also the first amount-setting magnet (No. 1) in column D, no amount-setting magnet being energized in column B because there is no "X" amount-setting magnet and ordinarily no zero amount-setting magnet. Each amount-setting magnet 232 which is thus energized draws down its core 246 to operate the corresponding amount-setting key 234 of the associated adding machine. The movement of the armature for each energized magnet 211 also moves the bar 216 of that column of selecting magnets, to disengage such bar from the contacts 219 corresponding to the other selecting magnets 211 of such column. The energization of the control magnet 226 of each column causes such control magnet to attract its armature 227, thus causing its disengagement from the contact 229 and its engagement with the contact 230. This makes ready for completion a branch holding circuit for these control magnets, which holding circuit is completed directly afterward in the movement of the commutator drum 190 by the engagement of the commutator segment 191 with the contact finger 196, which circuit thus completed is from the positive bus wire 242 through the spring fingers 194 and 196 and the commutator segment 191 to the control bus wire 257, and thence through each individual resistance 256 and the associated armature 227 and contact 230 to the control magnet 226. This holding circuit is in shunt to the circuits through the plungers 167 and contacts 165, and is preferably held closed longer, so that when later such last-named circuits are broken there will be no arcing at the breaking point, which is at the brush 187 and the commutator segment 186, and the control magnets 226 will not immediately be de-energized. As just stated, the breaking of the circuits through the plungers 167 and contacts 165 occurs at the brush 187 and commutator segment 186, for such commutator segment is moved by the cam 182 out of engagement with the brush 187 before the plunger plate 166 rises to disengage the plungers 167 and the contact 165. By this means such plungers and contacts are guarded absolutely from arcing, for they neither make nor break a circuit. The circuit through them is completed after they are in engagement, by the engagement of the brush 187 with the commutator segment 186; the circuit through them is broken while they are still in engagement, by the disengagement of the commutator segment 186 from the brush 187; and when such circuit is broken by such disengagement of the commutator segment 186 from the brush 187 there is in existence the branch holding circuit above described, so that even the break of the circuit at the commutator segment 186 and brush 187 is without appreciable arcing, because such circuit is carrying no current by reason of the existence of such branch holding circuit. By thus absolutely preventing arcing at the plungers 167 and contacts 165, all pitting or other deterioration of the contact surfaces thereof by reason of such arcing is absolutely prevented, and the plungers and contacts may be continued in use indefinitely, so that, as already stated, there was not a single failure in an actual test continuing for one hundred thirty-two thousand (132,000) operations. The branch holding circuit referred to, by way of the wire 257, the armature 227, and the contact 230, remains closed as long as the commutator segment 191 remains in engagement with the contact finger 196, which engagement continues for something less than 180° of commutator rotation (but after the disengagement of the segment 186 from the brush 187); such engagement continues, however, until well after the commutator segment 193 comes into engagement with the spring contact fingers 198 and 199 and until after the commutator segment 191 has first engaged and then left the spring contact finger 195. When as the commutator 190 rotates this engagement takes place of the commutator segment 191 and contact finger 195, a circuit is completed therethrough for the accumulating magnet 239, which being thus energized operates the accumulating (or motor-control) key or lever 235 to add in to the adding machine the amount which has been set by the operation of the various amount-setting magnets 232 as already described. After the accumulating operation has taken place and the accumulating magnet 239 de-energized by the disengagement of the commutator segment 191 from the contact finger 195, such commutator segment separates from the contact finger 196 to produce the de-energization of the several control magnets 226, whereupon the armatures 227 are swung back by their springs out of engagement with their contacts 230 and into engagement with their contacts 229, ready for the next operation. The commutator segment 193 plays no part at this time, but only comes into play upon the adding operation, to be described later. By this time the reciprocating frame 130 has about reached its right hand limit of movement, and the plunger plate 166 has begun to rise. Then the contact segment 192, in the continued rotation of the commutator 190, engages the contact finger 197, thereby completing the circuit to the feed magnet 138 and discharge solenoids 148, which render operative the feed finger 143 and the discharge fingers 151 and keep them so during the movement of such feed frame to the left by reason of the length of the commutator segment 192. Thus in such movement to the left the card which is on the control plate is fed therefrom to the discharge wheel 116, and the card at the top of the pile 32 is fed therefrom on to the control plate 125. At the end of this feeding and discharging operation, which occurs when the feed frame has reached its left hand limit of movement, the feed finger 142 and discharge fingers 151 are rendered inoperative by the breaking of their energizing circuit, and the plunger plate 166 again descends, but with this new card on the control plate 125. Upon such descent, some of the plungers 167 pass through the holes in this card into engagement with the corresponding contacts 165, preparing the corresponding circuits for completion. Such completion takes place, as before, when the commutator segment 186 comes into engagement with the brush 187, and causes the operation of the corresponding amount-setting magnets 232 and their associated amount-setting keys 234, whether or not the amount-setting keys thus operated are the same as those operated during the preceding cycle. If the holes in the selecting columns in this new card—that is, the holes in the columns whose contacts 165 are connected to columns of selecting magnets 211—are the same in all instances as those in the preceding card on the control plate 125, the same selecting circuits are completed as before, and the operation just described is repeated, to produce the adding in of the amounts determined by the depressed amount-setting keys 234. However, if the holes in any of these selecting columns are different in this new card from those in the preceding card, a different series of actions is initiated. Assume that in column C the fourth (No. 2) plunger 167 engages its corresponding contact 165 instead of the third (No. 1) as in the previous cycle. As already stated, the amount-setting magnets 232 of all the columns operate their amount-setting keys 234, for whatever the holes in the new card indicate, whether they are the same or different. The circuit for the fourth (No. 2) selecting magnet 211 in column C is not completed, however, for the contact 219 on the armature of such magnet is not in contact with the bar 216, because such bar had been moved in the previous cycle out of engagement with all the contacts 219 save that for the third (No. 1) magnet 211. Therefore, the control magnet 226 for column C is likewise not energized, and the armature 227 for such magnet remains in engagement with contact 229 instead of being drawn into engagement with contact 230. Immediately after the completion of the circuits through the contacts 165 by the engagement of the commutator segment 186 and brush 187, the commutator segment 191 engages the contact finger 196 to connect the control bus wire 257 to the positive bus wire 242, and this completes a circuit for column C from the control bus wire 257 through the resistance 256, armature 227, and contact 229, to the re-setting magnet 222, and thence through the re-setting bus wire 250 and high resistance magnet 251 to the negative bus wire 238. The resistance of the magnet 251 is sufficiently high so that not enough current flows through the re-setting magnet 222 to cause it to operate; but the magnet 251 is itself energized sufficiently strongly to operate its armature 244 and draw it into engagement with the contact 243. This simultaneously completes a number of circuits, as follows:

First. A circuit from the positive bus wire through the lifting solenoid 189, contact 243, and armature 244 to the negative bus wire 238, causing such solenoid 189 to lift the

for printing by the previous operation of the totalizing key 236 by the totalizing magnet 240. The commutator segment 203 passes out of engagement with the contact finger 208 at about the end of this second third of the rotation of the commutator 200. During the final third of the rotation of the commutator 200, the movement of the commutator 190 produces an operation of the accumulator key 235 by its magnet 239, to produce a spacing forward of the record sheet in the adding machine, but without producing any operation of the accumulators of such machine because no amount-setting keys 234 are depressed. As the commutator 200 reaches the end of its rotation, the contact segment 203 thereof passes out of engagement with the spring contact finger 207, thereby breaking the circuit for the magnets 252 and 253 so that the armatures 244 and 254 swing out of engagement with the contact 243 and into engagement with the contact 255 respectively. The latter makes possible the energization of the feeding magnet and the discharge solenoid during the cycle next to come. The former breaks the circuits for the magnets 189, 241, and 107, thus permitting the brush 187 to drop into position so as to be ready to engage the commutator segment 186 during the next cycle, releasing the error key, and unclutching the commutator 200 from the gear 107, so as to stop the rotation of such commutator. When in the next cycle the plunger plate 166 descends on to the card on the control plate 125, which is the fourth time it has descended on this same card, the circuits which are prepared for completion by the engagement of the plungers 167 and contacts 165 through the holes in such card are completed by the engagement of the commutator segment 186 with the brush 187, so as to produce the same operation of the amount-setting magnets 232 which was produced during the first descent of the plunger plate on that card in the third preceding cycle, and also causing the corresponding selecting magnets 211 to be energized, the fourth (No. 2) selecting magnet in column C being energized this time, so as to cause the bars 216 of all the columns of selecting magnets to be moved to the position indicated in Fig. 25, and all the control magnets 226 to be energized to swing their armatures 227 into engagement with the contacts 230, and out of engagement with the contacts 229, so that as the cycle continues the circuits completed by the commutator 190 cause the amounts set on the amount-setting keys 234 to be added in to the accumulators of the adding machine by the operation of the accumulating key 235 by its solenoid 239, and after such adding in to cause the feed finger 142 and discharge fingers 151 to be rendered operative to feed a card from the pile 32 under the control plate and to discharge into the discharge wheel 116 the card which has now been on the control plate for four cycles. This is repeated as long as the punchings in the selecting columns in the cards fed on to the control plate 125 remain unchanged, to produce an adding in of the amounts indicated by the amount-setting punchings in such cards. But when a card with a different punching in any selecting column comes on to the plate 125, the error key is caused to be operated and then the totalizing key to obtain the totals of the amounts added in for all the cards in the preceding group with identical controlling punchings, as has already been described.

Thus the machine feeds a card from the pile 32 on to the control plate 125 and the preceding card from such control plate into the discharge mechanism so long as the controlling punchings in the cards remain unchanged. As each card rests on the control plate 125, the plunger 166 descends thereupon, and causes operation of the amount-setting keys of the adding machine to correspond with the punchings in such card. After such setting has been obtained, the operation of the commutator 190 causes the operation of the accumulating key or lever 235, to produce the adding into the accumulators of the adding machine of the amounts which have been set on the amount-setting keys. This is repeated as each card passes on to the control plate 125, so long as the controlling punchings in each new card are the same as those in the one which preceded it. When a card passes on to the control plate 125 with different controlling punchings therein, the amount-setting keys 234 are operated for the punchings of such card, but the normal adding operation proceeds no further, for immediately thereafter the error key 237 is operated to release the amount-setting keys which have thus been set, the brush 187 is lifted so as to prevent for three operations any closing of the circuits through the plungers 167 and contacts 165, and the circuits controlled thereby, the auxiliary commutator 200 is set into motion, the operation of the feeding and discharge mechanism is suspended for three cycles by making it impossible for the magnet 138 and solenoids 148 to be energized, and during the first of these cycles the accumulating key or lever 235 is operated to produce a spacing of the record sheet and to prepare the adding machine for a totalizing operation, during the second of these cycles the totalizing key 236 and the accumulating key or lever 235 are both operated to produce a totalizing and clearing action, and during the third cycle the accumulating key or lever is operated to produce a spacing on the record sheet below the total which has just been printed. Upon the beginning of the fourth cycle, the parts which have been disabled are returned to normal condition, so that this fourth cycle on this same card on the control plate 125 is the first cycle of a new series, which continues as before as long as the controlling punchings in the cards successively fed on to the control plate 125 do not change. When such punchings do change, a totalizing action is obtained as before.

The "X" plunger 167 and contact 165, and the "X" selecting magnet 211, of any column, are for the purpose of cutting that column out of operation, the proper holes being punched in the cards for obtaining this result. The reasons for these "X" punchings and contacts are not essential here. Sometimes it is desirable that a single "X" plunger and contact have supervisory control over a number of columns. Thus for instance, the columns A, B, and C may be interconnected by inserting plugs 281 in the connection between the cross connection between column A and column B and the cross connection between column B and C. Assuming then that the first (X) plunger 167 in column A is the supervisory control plunger, then the engagement of such plunger with its contact 165 not only causes the energization of the first (X) selecting magnet 211 of that column, but also of the first (X) selecting magnet 211 for columns B and C by reason of such cross connection.

Sometimes it is desirable that the grouping be independent of certain columns. When such is the case, any desirable column or columns which it is desirable to render ineffective may be cut out by having the corresponding plug or plugs 280 inserted. This produces a continuous connection of the first (X) magnet 211 of such column to the positive bus wire 242, independent of the plunger operation and of the position of the brush 187, and a continuous holding of the armature 227 of such column against its contact 230, so as to make impossible the operation of the re-setting magnets 222 of such column.

I claim as my invention:

1. An accounting machine, comprising a member for successively cooperating with a series of cards all having characteristics denoting amounts and card grouping, adding mechanism having amount-setting devices which upon such cooperation are set to correspond with such amount-denoting characteristics in the successive cards and accumulating mechanism for adding in the amounts so set, and means automatically controlled by the coming into cooperation of said member with a card in said series having different card-group-denoting characteristics from the preceding card in said series for totalizing the amounts added previously in on the accumulating mechanism.

2. An accounting machine, comprising a member for successively cooperating with a series of cards having distinguishing characteristics, adding mechanism having amount-setting devices which upon such cooperation are set to correspond with such distinguishing characteristics in the successive cards and accumulating mechanism for normally adding in the amounts so set for each such setting and an error member which when operated restores said amount-setting members to normal, and means controlled by the cooperation of said members with a card having different controlling characteristics from the preceding card for causing the operation of said error member to release said amount-setting members before the amounts set thereby have been added into the accumulator mechanism and for then totalizing the amounts already added in on the accumulating mechanism.

3. An accounting machine, comprising a member for successively cooperating with a series of cards having distinguishing characteristics, adding mechanism having amount-setting devices which upon such cooperation are set to correspond with such distinguishing characteristics in the successive cards and accumulating mechanism for adding in the amounts so set, means for successively feeding said cards into cooperative relationship with said member and discharging them from such cooperative relationship, and means controlled by the cooperation of said member with a card having different controlling characteristics from the preceding card for totalizing the amounts added in on the accumulating mechanism and for intermitting the action of said feeding and discharge means.

4. An accounting machine, comprising a member for successively cooperating with a series of cards having distinguishing characteristics, adding mechanism having amount-setting devices which upon such cooperation are set to correspond with such distinguishing characteristics in the successive cards and accumulating mechanism for normally adding in the amounts so set for each such setting and an error member which when operated restores said amount-setting members to normal, means for successively feeding said cards into cooperative relationship with said member and discharging them from such cooperative relationship, and means controlled by the cooperation of said member with a card having different controlling characteristics from the preceding card for causing the operation of said error member to release said amount-setting members before the amounts set thereby have been added into the accumulator mechanism and for then totalizing the amounts already added in on the accumulating mechanism and for intermitting the action of said feeding and discharge means.

5. An accounting machine, comprising a member for successively cooperating with a series of cards all having characteristics denoting amounts and card grouping, adding mechanism for accumulating the amounts determined by the amount-denoting characteristics of the various cards as they cooperate with said member, and means controlled by the coming into cooperation of said member with a card having different card-group-denoting characteristics from the preceding card for suspending said accumulating action and during the period of suspension causing a total to be taken of the amounts already accumulated for preceding cards.

6. An accounting machine, comprising a member for successively cooperating with a series of cards having distinguishing characteristics, adding mechanism for accumulating the amounts determined by the distinguishing characteristics of the various cards as they cooperate with said member, and means controlled by the cooperation of said member with a card having different controlling characteristics from the preceding card for causing a total to be taken of the amounts already accumulated for preceding cards before accumulating the amounts determined by the card which causes said totalizing action.

7. An accounting machine, comprising a member for successively cooperating with a series of cards having distinguishing characteristics, adding mechanism for accumulating the amounts determined by the distinguishing characteristics of the various cards as they cooperate with said member, and means controlled by the cooperation of said member with a card having different controlling characteristics from the preceding card for causing a total to be taken of the amounts already accumulated for preceding cards and clearing the adding mechanism before accumulating the amounts determined by the card which causes said totalizing action.

8. An accounting machine, comprising a member for successively cooperating with a series of cards all having characteristics denoting amounts and card grouping, adding mechanism for accumulating the amounts determined by the amount-denoting characteristics of the various cards as they cooperate with said member, and means controlled by the coming into cooperation of said member with a card having different card-group-denoting characteristics from the preceding card for suspending said accumulating action and during the period of suspension causing a total to be taken of the amounts already accumulated for preceding cards and clearing the adding mechanism.

9. An accounting machine, comprising a member for successively cooperating with a series of cards all having characteristics denoting amounts and card grouping, adding mechanism having amount-setting devices which upon such cooperation are set to correspond with such amount-denoting characteristics in the successive cards and accumulating mechanism for adding in the amounts so set, and means controlled by the coming into cooperation of said member with a card having different card-group-denoting characteristics from the preceding card for totalizing the amounts previously added in on the accumulating mechanism and then clearing the adding mechanism.

10. An accounting machine, comprising a member for successively cooperating with a series of cards having distinguishing characteristics, adding mechanism having amount-setting devices which upon such cooperation are set to correspond with such distinguishing characteristics in the successive cards and accumulating mechanism for normally adding in the amounts so set for each such setting and an error member which when operated restores said amount-setting members to normal, and means controlled by the cooperation of said member with a card having different controlling characteristics from the preceding card for causing the operation of said error member to release said amount-setting members before the amounts set thereby have been added into the accumulator mechanism and for then totalizing the amounts already added in on the accumulating mechanism and then clearing the accumulating mechanism.

11. An accounting machine, comprising a member for successively cooperating with a series of cards having distinguishing characteristics, adding mechanism having amount-setting devices which upon such cooperation are set to correspond with such distinguishing characteristics in the successive cards and accumulating mechanism for adding in the amounts so set, and means controlled by the cooperation of said member with a card having different controlling characteristics from the preceding card for totalizing the amounts added in on the accumulating mechanism and then clearing the adding mechanism and for intermitting the progression in the successive cooperation of said member with said series of cards during the totalizing and clearing actions.

12. An accounting machine, comprising a member for successively cooperating with a series of cards having distinguishing characteristics, adding mechanism having amount-setting devices which upon such cooperation are set to correspond with such distinguishing characteristics in the successive cards and accumulating mechanism for normally adding in the amounts so set for each such setting and an error member which when operated restores said amount-setting members to normal, and means controlled by the cooperation of said member with a card having different controlling characteristics from the preceding card for causing the operation of said error member to release said amount-setting members before the amounts set thereby have been added into the accumulator mechanism and for then totalizing the amounts already added in on the accumulating mechanism and then clearing the accumulating mechanism and for intermitting the progression in the successive cooperation of said member with said series of cards during the totalizing and clearing actions.

13. In combination, a control member, a feeding device for feeding to and from said control member cards all having characteristics denoting amounts and card grouping, adding mechanism, operating devices for said adding mechanism controlled by the cooperation of each card with said control member, and means controlled by the coming into cooperation of each card with the control member for selectively determining whether said operating devices shall produce an accumulating or a totalizing operation of said adding mechanism according as the card-group-denoting characteristics of that card are the same as or different from those of the preceding card.

14. In combination, a control member, a feeding device for feeding to and from said control member cards all having characteristics denoting amounts and card grouping, adding mechanism, operating devices for said adding mechanism controlled by the cooperation of each card with said control member, and means controlled by the coming into cooperation of each card with the control member for selectively determining whether said operating devices shall produce an accumulating or a totalizing and clearing operation of said adding mechanism according as the card-group-denoting characteristics of that card are the same as or different from those of the preceding card.

15. In combination, a control member, a feeding device for feeding cards to and from said control member, adding mechanism, operating devices for said adding mechanism controlled by the cooperation of each card with said control member, and means controlled by each card fed by the control member for selectively determining whether said operating devices shall produce an accumulating action of the adding mechanism and said feeding device shall continue its feeding action or said operating devices shall produce a totalizing operation of said adding mechanism and said feeding device shall intermit its feeding action.

16. In combination, a control member, a feeding device for feeding cards to and from said control member, adding mechanism, operating devices for said adding mechanism controlled by the cooperation of each card with said control member, and means controlled by each card fed by the control member for selectively determining whether said operating devices shall produce an accumulating action of the adding mechanism and said feeding device shall continue its feeding action or said operating devices shall produce a totalizing and clearing operation of said adding mechanism and said feeding device shall intermit its feeding action.

17. In combination, electrical contact mechanism cooperating successively with a series of cards and controlled by punchings in said cards, said contact mechanism having a plurality of contacts, adding mechanism having amount-setting members and accumulating and totalizing actions, electro-magnetic operating means for said amount-setting members, said various operating means being respectively controlled by different contacts of said contact mechanism, and means controlled by the cooperation of each card with said contact mechanism for selectively producing either the accumulating or the totalizing action of said adding mechanism.

18. In combination, electrical contact mechanism cooperating successively with a series of cards and controlled by punchings in said cards, said contact mechanism having a plurality of contacts, adding mechanism having amount-setting members and accumulating, error, and totalizing actions, electromagnetic operating means for said amount-setting members, said various operating means being respectively controlled by different contacts of said contact mechanism, and means controlled by the cooperation of each card with said contact mechanism for selectively producing either the accumulating action or the error and totalizing actions of said adding mechanism.

19. In combination, electrical contact mechanism cooperating successively with a series of cards and controlled by punchings in said cards, said contact mechanism having a plurality of contacts, power-operated adding mechanism, and electro-magnetically operated means controlled by said contact mechanism for selectively causing said adding mechanism to accumulate or to totalize.

20. In combination, electrical contact mechanism cooperating successively with a series of cards and controlled by punchings in said cards, said contact mechanism having a plurality of contacts, power-operated adding mechanism, an electro-magnetically operated member having two positions and selectively controlled by said contact mechanism, and means controlled by said electro-magnetically operated member for causing said adding mechanism to accumulate when said member is in one position and to totalize when said member is in the other position.

21. In combination, electrical contact mechanism cooperating successively with a series of cards and controlled by punchings in said cards, said contact mechanism having a plurality of contacts, power-operated adding mechanism, and electro-magnetically operated means controlled by said contact mechanism for selectively causing said adding mechanism to accumulate or to totalize and for causing an intermitting in the progression in the successive cooperation of said contact mechanism with said cards when said adding mechanism is caused to totalize.

22. In combination, electrical contact mechanism cooperating successively with a series of cards and controlled by punchings in said cards, said contact mechanism having a plurality of contacts, power-operated adding mechanism, an electro-magnetically operated member having two positions and selectively controlled by said contact mechanism, and means controlled by said electro-magnetically operated member for causing said adding mechanism to accumulate when said member is in one position and to totalize when said member is in the other position and for causing an intermitting in the progression in the successive cooperation of said contact mechanism with said cards when said adding mechanism is caused to totalize.

23. In combination, electrical contact mechanism cooperating successively with a series of cards and controlled by punchings in said cards, said contact mechanism having a plurality of contacts, power-operated adding mechanism, an electro-magnetically operated member having two positions, said member being selectively controlled by said contact mechanism to take one position when controlling punchings in a card cooperating with said contact mechanism are the same as in the preceding card and to take the other position temporarily when such controlling punchings are different from those in the preceding card, and means controlled by said electro-magnetically operated member for causing said adding mechanism to accumulate when said member is in the first position and to totalize when said member is in the second position.

24. In combination, electrical contact mechanism cooperating successively with a series of cards and controlled by punchings in said cards, said contact mechanism having a plurality of contacts, power-operated adding mechanism, an electro-magnetically operated member having two positions, said member being selectively controlled by said contact mechanism to take one position when controlling punchings in a card cooperating with said contact mechanism are the same as in the preceding card and to take the other position temporarily when such controlling punchings are different from those in the preceding card, and means controlled by said electro-magnetically operated member for causing said adding mechanism to accumulate when said member is in the first position and to totalize when said member is in the second position and for causing an intermitting in the progression in the successive cooperation of said contact mechanism with said cards when said member is in said second position.

25. In combination, electrical contact mechanism cooperating successively with a series of cards and controlled by punchings in said cards, said contact mechanism having a plurality of groups of contacts, power-operated adding mechanism, electro-magnetically operated means selectively controlled by groups of said contacts for determining the amounts added in by the adding machine for each card, and electro-magnetically operated means selectively controlled by groups of said contacts for selectively determining whether said adding machine shall add in such amounts for each card or shall totalize for preceding cards.

26. In combination, electrical contact mechanism cooperating successively with a series of cards and controlled by punchings in said cards, said contact mechanism having a plurality of groups of contacts, power-operated adding mechanism, electro-magnetically operated means selectively controlled by groups of said contacts for determining the amounts added in by the adding machine for each card, an electro-magnetically operated member for each of a plurality of groups of such contacts, each of said members having two positions and being selectively controlled by its associated group of contacts, and means controlled by said electro-magnetically operated members jointly for causing said adding machine to accumulate when said members are all moved to one position and to totalize when any of said members is left in the other position.

27. In combination, electrical contact mechanism cooperating successively with a series of cards and controlled by punchings in said cards, said contact mechanism having a plurality of groups of contacts, power-operated adding mechanism, electro-magnetically operated means selectively controlled by groups of said contacts for determining the amounts added in by the adding machine for each card, and electro-magnetically operated means selectively controlled by groups of said contacts for selectively determining whether said adding machine shall add in such amounts for each card or shall totalize for preceding cards and for causing an intermitting in the progression in the successive cooperation of said contact mechanism with said cards when said adding mechanism is caused to totalize.

28. In combination, electrical contact mechanism cooperating successively with a series of cards and controlled by punchings in said cards, said contact mechanism having a plurality of groups of contacts, power-operated adding mechanism, electro-magnetically operated means selectively controlled by groups of said contacts for determining the amounts added in by the adding machine for each card, an electro-magnetically operated member for each of a plurality of groups of such contacts, each of said members having two positions and being selectively controlled by its associated group of contacts, and means controlled by said electro-magnetically operated members jointly for causing said adding machine to accumulate when said members are all moved to one position and to totalize when any of said members is left in the other position and for causing an intermitting in the progression in the successive cooperation of said contact mechanism with said cards when said adding mechanism is caused to totalize.

29. In combination, electrical contact mechanism cooperating successively with a series of cards and controlled by punchings in said cards, said contact mechanism having a plurality of groups of contacts, power-operated adding mechanism, electro-magnetically operated means selectively controlled by groups of said contacts for determining the amounts added in by the adding machine for each card, an electro-magnetically operated member for each of a plurality of groups of such contacts, each of said members having two positions and being selectively controlled by its associated group of contacts to take one position when the punching for such group of contacts in a card cooperating with said contact mechanism is the same as in the preceding card and to take the other position when such punching is different from that in the preceding card, and means controlled by said electro-magnetically operated members jointly for causing said adding machine to accumulate when said members are all moved to the first position and to totalize when any of them is left in the second position.

30. In combination, electrical contact mechanism cooperating successively with a series of cards and controlled by punchings in said cards, said contact mechanism having a plurality of groups of contacts, power-operated adding mechanism, electro-magnetically operated means selectively controlled by groups of said contacts for determining the amounts added in by the adding machine for each card, an electro-magnetically operated member for each of a plurality of groups of such contacts, each of said members having two positions and being selectively controlled by its associated group of contacts to take one position when the punching for such group of contacts in a card cooperating with said contact mechanism is the same as in the preceding card and to take the other position when such punching is different from that in the preceding card, and means controlled by said electro-magnetically operated members jointly for causing said adding machine to accumulate when said members are all moved to the first position and to totalize when any of them is left in the second position and for causing an intermitting in the progression in the successive cooperation of said contact mechanism with said cards when said adding mechanism is caused to totalize.

31. In combination, electrical contact mechanism, means for feeding cards successively to said contact mechanism, said cards being provided with punchings through which contacting engagement of said contact mechanism is selectively made according to the locations of the punchings, and a main switch controlling the circuit through said contact mechanism and making such circuit after the contacting engagement is made through the card punchings and breaking it before such contacting engagement is broken.

32. In combination, electrical contact mechanism, means for feeding cards successively to said contact mechanism, said cards being provided with punchings and said contacting mechanism with members which project through said punchings to control selectively the contacts made by said contact mechanism, and a main switch controlling the circuit through said contact mechanism and making such circuit after the contacting engagement at the contact mechanism is made and breaking it before such contacting engagement at the contact mechanism is broken.

33. In combination, electrical contact mechanism, means for feeding cards successively to said contact mechanism, said cards being provided with punchings through which contacting engagement of said contact mechanism is selectively made according to the locations of the punchings, a main switch controlling the circuit to said contact mechanism, and means selectively controlled by punchings in the cards which successively cooperate with said contact mechanism for controlling said main switch.

34. In combination, electrical contact mechanism, means for feeding cards successively to said contact mechanism, said cards being provided with punchings and said contacting mechanism with members which project through said punchings to control selectively the contacts made by said contact mechanism, a main switch controlling the circuit to said contact mechanism, and means selectively controlled by punchings in the cards which successively cooperate with said contact mechanism for controlling said main switch.

35. In combination, a card-feeding device for feeding cards successively from a pile, power-operated adding mechanism, and means cooperating successively with the cards from said pile for selectively determining whether said card-feeding device shall continue or intermit its feeding action of cards from such pile and for selectively determining whether said adding mechanism shall accumulate or totalize and if accumulating what amounts shall be accumulated.

36. In combination, a card-feeding device for feeding cards successively from a pile, power-operated adding mechanism, and means cooperating successively with the cards from said pile and controlled by punchings in said cards for normally causing said adding mechanism to accumulate amounts determined by punchings in each card as it is fed but to cause said card-feeding device to intermit its feeding action and said adding mechanism to totalize the amounts already accumulated when a card having different controlling punchings from the preceding card is reached.

37. In combination, a member cooperating successively with a series of punched cards, all having punchings denoting amounts and card grouping, power-operated adding mechanism, means controlled by the amount-denoting punchings in successive cards as they cooperate with said member for selectively setting said adding machine, and means selectively controlled by the card-group-denoting punchings of each card as it comes into cooperation with said member for determining whether said adding machine shall accumulate or totalize.

38. An accounting machine, comprising a member for successively cooperating with a series of cards all having characteristics denoting amounts and card groupings, adding mechanism having amount-setting devices which upon such cooperation are set to correspond with such amount-denoting characteristics in the successive cards, and means controlled by the coming into cooperation of said member with a card for selectively producing either an accumulating or a totalizing action of the adding mechanism according as the card-group-denoting characteristics of that card are the same as or different from those of the preceding card.

39. An accounting machine, comprising a member for successively cooperating with a series of cards having distinguishing characteristics, adding mechanism having amount-setting devices which upon such cooperation are set to correspond with such distinguishing characteristics in the successive cards, means for successively feeding said cards into cooperative relationship with said members and discharging them from such cooperative relationship, and means controlled by the co-operation of said member with a card for selectively producing either an accumulating or a totalizing action of the adding mechanism and for intermitting the action of said feeding and discharge means when a totalizing action is produced.

40. An accounting machine, comprising a member for successively cooperating with a series of cards all having characteristics denoting amounts and card grouping, adding mechanism having amount-setting devices which upon such cooperation are set to correspond with such amount-denoting characteristics in the successive cards, and means controlled by the coming into cooperation of said member with a card for selectively producing either an accumulating or a totalizing and clearing action of the adding mechanism according as the card-group-denoting characteristics of that card are the same as or different from those of the preceding card.

41. An accounting machine, comprising a member for successively cooperating with a series of cards having distinguishing characteristics, adding mechanism having amount-setting devices which upon such cooperation are set to correspond with such distinguishing characteristics in the successive cards, means for successively feeding said cards into cooperative relationship with said members and discharging them from such cooperative relationship, and means controlled by the co-operation of said member with a card for selectively producing either an accumulating or a totalizing and clearing action of the adding mechanism and for intermitting the action of said feeding and discharge means when a totalizing action is produced.

42. An accounting machine, comprising a member for succesively cooperating with a series of cards having distinguishing characteristics, adding mechanism for accumulating the amounts determined by the distinguishing characteristics of the various cards as they cooperate with said member, and means controlled by the cooperation of said member with a card having different controlling characteristics from the preceding card for suspending said accumulating action and during the period of suspension causing a total to be taken of the amounts already accumulated for preceding cards and for intermitting the progression in the successive cooperation of said member with said series of cards during the totalizing action.

43. An accounting machine, comprising a member for successively cooperating with a series of cards having distinguishing characteristics, adding mechanism for accumulating the amounts determined by the distinguishing characteristics of the various cards as they cooperate with said member, and means controlled by the cooperation of said member with a card having different controlling characteristics from the preceding card for suspending said accumulating action and during the period of suspension causing a total to be taken of the amounts already accumulated for preceding cards and clearing the adding mechanism and for intermitting the progression in the successive cooperation of said member with said series of cards during the totalizing and clearing actions.

44. In combination, electrical contact mechanism, means for feeding cards successively to said contact mechanism, said cards being provided with punchings through which contacting engagement of said contact mechanism is selectively made according to the locations of the punchings, a cooperating rotating commutator and brush controlling the circuit through said contact mechanism and making such circuit after the contacting engagement is made through the card punchings and breaking it before such contacting engagement is broken, and means selectively controlled by the cooperation of the successive cards with the contact mechanism for lifting said brush from said commutator.

45. In combination, electrical contact mechanism, means for feeding cards successively to said contact mechanism, said cards being provided with punchings and said contacting mechanism with members which project through said punchings to control selectively the contacts made by said contact mechanism, a cooperating rotating commutator and brush controlling the circuit through said contact mechanism and making such circuit after the contacting engagement at the contact mechanism is made and breaking it before such contacting engagement is broken, and means selectively controlled by the cooperation of the successive cards with the contact mechanism for lifting said brush from said commutator.

46. In combination, electrical contact mechanism, means for feeding cards successively to said contact mechanism, said cards being provided with punchings which control the contacting operation of said contact mechanism, a commutator normally operating synchronously with said feeding mechanism, a normally inoperative supplemental commutator and means controlled thereby, and means controlled by the cooperation of cards with said contact mechanism for rendering said supplemental commutator operative.

47. In combination, electrical contact mechanism, means for feeding cards successively to said contact mechanism, said cards being provided with punchings which control the contacting operation of said contact mechanism, a commutator normally operating synchronously with said feeding mechanism, a normally inoperative supplemental commutator and means controlled thereby, and means controlled by the cooperation of said contact mechanism with a card having different controlling punchings from the preceding card for rendering said supplemental commutator operative.

48. In combination, electrical contact mechanism, means for feeding cards successively to said contact mechanism, said cards being provided with punchings which control the contacting operation of said contact mechanism, a commutator normally operating synchronously with said feeding mechanism, a normally inoperative supplemental commutator and means controlled thereby, means controlled by the cooperation of cards with said contact mechanism for rendering said supplemental commutator operative, and adding mechanism controlled by said contact mechanism and said two commutators.

49. In combination, electrical contact mechanism, means for feeding cards successively to said contact mechanism, said cards being provided with punchings which control the contacting operation of said contact mechanism, a commutator normally operating synchronously with said feeding mechanism, a normally inoperative supplemental commutator, and means controlled by the cooperation of said contact mechanism with a card having different controlling punchings from the preceding card for rendering said supplemental commutator operative; and adding mechanism having amount-setting members controlled by said contact mechanism, accumulating mechanism controlled by said first commutator, and totalizing mechanism which is controlled by said supplemental commutator.

50. In combination, electrical contact mechanism, means for feeding cards successively to said contact mechanism, said cards being provided with punchings which control the contacting operation of said contact mechanism, a commutator normally operating synchronously with said feeding mechanism, a normally inoperative supplemental commutator and means controlled thereby, means controlled by the cooperation of cards with said contact mechanism for rendering said supplemental commutator operative, and means for controlling the operation of said feeding means by said first commutator and for causing the intermitting of the feeding action of the feeding means by said supplemental commutator.

51. In combination, electrical contact mechanism, means for feeding cards successively to said contact mechanism, said cards being provided with punchings which control the contacting operation of said contact mechanism, a commutator normally operating synchronously with said feeding mechanism, a normally inoperative supplemental commutator and means controlled thereby, means controlled by the cooperation of said contact mechanism with a card having different controlling punchings from the preceding card for rendering said supplemental commutator operative, means for normally controlling the action of the feeding means by said main commutator, and means controlled by the supplemental commutator for rendering ineffective the control of said feeding means by said first commutator.

52. In combination, electrical contact mechanism, means for feeding cards successively to said contact mechanism, said cards being provided with punchings and said contacting mechanism with members which project through said punchings to control selectively the contacts made by said contact mechanism, a cooperating rotating commutator and brush controlling the circuit through said contact mechanism and breaking such circuit before the contacting engagement through the card punchings is broken, and means selectively controlled by the cooperation of the successive cards with the contact mechanism for lifting said brush from said commutator.

53. In combination, electrical contact mechanism, means for feeding cards successively to said contact mechanism, said cards being provided with punchings through which contacting engagement of said contact mechanism is selectively made according to the locations of the punchings, a cooperating rotating commutator and brush controlling the circuit through said contact mechanism and breaking such circuit before the contacting engagement through the card punchings is broken, and means selectively controlled by the cooperation of the successive cards with the contact mechanism for lifting said brush from said commutator.

54. In combination, electrical contact mechanism, means for feeding cards successively to said contact mechanism, said cards being provided with punchings through which contacting engagement of said contact mechanism is selectively made according to the locations of the punchings, and a main switch controlling the circuit through said contact mechanism and breaking such circuit before the contacting engagement through the card punchings is broken.

55. In combination, electrical contact mechanism, means for feeding cards successively to said contact mechanism, said cards being provided with punchings and said contacting mechanism with members which project through said punchings to control selectively the contacts made by said contact mechanism, and a main switch controlling the circuit through said contact mechanism and breaking such circuit before the contacting engagement at the contact mechanism is broken.

56. In a card accounting machine, the combination with an automatic registering mechanism of a total taking mechanism; and means acting to automatically operate the total taking mechanism and to automatically resume the operation of the registering mechanism.

57. In a card accounting machine, the combination with an automatic registering mechanism of a total taking mechanism; and card controlled means acting to automatically operate the total taking mechanism and to automatically resume the operation of the registering mechanism.

58. In a card accounting machine, the combination with an automatic registering mechanism controlled by record containing cards; of a total taking mechanism for giving the combined results of the records from a number of cards, and means acting to automatically operate the total taking mechanism and to automatically resume the operation of the registering mechanism.

59. In combination, a feeding mechanism for registration control-means; an automatic registering mechanism; a total-taking mechanism and a means for automatically operating the total-taking mechanism, automatically continuing the operation of feeding mechanism, and automatically resuming the operation of the registering mechanism.

60. In combination, automatic registering mechanism; automatic total-taking mechanism; and means for automatically initiating automatic total-taking by said total-taking mechanism.

61. In a card accounting machine, the combination of an automatic registering mechanism; a total-taking mechanism; and means acting to automatically operate the total-taking mechanism.

62. In a card accounting machine, the combination of an automatic registering mechanism, a total-taking mechanism; and card controlled means acting to automatically operate the total-taking mechanism.

63. In a card accounting machine, the combination of an automatic registering mechanism; a total-taking mechanism; and means to automatically take a total between two registering operations.

64. In a device controlled by successively presented control means having thereon index points representing items and designations, the combination of accumulating means adapted to accumulate said items; total taking mechanism for taking the totals of the accumulated items; a sensing means adapted to sense the points representing the designations and to be set in operation by the presentation of a designation different from that of the preceding control means for bringing about the controlling of said total-taking mechanism.

65. In a device controlled by successively presented control means having thereon index points representing items and designations, the combination of accumulating means adapted to accumulate said items; total-taking mechanism; a sensing means adapted to sense the designations and to be set in operation by the presentation of a designation different from that of the preceding control means for bringing about the taking of totals.

66. In a device controlled by successively presented cards having thereon index points representing items and designations, the combination of accumulating means adapted to accumulate said items; total-taking mechanism; a sensing means adapted to sense the designations and to be set in operation by the presentation of a designation different from that of the preceding card for bringing about the taking of totals, and the resetting of the sensing means.

67. In a device controlled by successively presented cards having index points thereon, the combination of operating means adapted for different kinds of calculating operations; a sensing means adapted to sense the index points of said cards and to be automatically set in operation by the presentation of a card having an index point different from that of the preceding card or group of cards thereby to bring about a change from one of said calculating operations to the other.

68. In a device controlled by successively presented cards having thereon index points representing items and designations, the combination of feeding means for presenting the cards one at a time to sensing position; accumulating means adapted to accumulate said items; mechanism for taking and printing the totals of and clearing the accumulated items; and a sensing means adapted to sense the points representing the designations and to be set in operation by the presentation of a designation different from that of the next preceding card, for bringing about the taking and printing of a total of and clearing the accumulated items before the feeding to said position of the next succeeding card, the resetting of the sensing means after the said feeding, and then the resumption of the accumulating of items and the sensing of designations.

69. In a card accounting machine, automatic registering mechanism controlled by record cards, means for feeding the cards thereto, and means controlled by a record card having variant characteristics from certain of the other cards for stopping and automatically resuming the operation of the feeding means.

70. In a card accounting machine, the combination of a registering mechanism controlled by a sequential run of cards, a total taking mechanism, and means controlled by a change in character of two successive register controlling cards in said sequence for automatically taking a total.

71. In a card accounting machine, registering mechanism controlled by record cards, means for feeding cards thereto, total taking mechanism and means governed by any one of each single successive record cards for detecting record group changes and for controlling the operation of the total taking mechanism to totalize a series of registrations of a group on the occurrence of a change.

72. In a card accounting machine, the combination with record cards having index points, automatic registering mechanism controlled by said record cards, means governed successively by single individual record cards for maintaining the normal operation of the registering mechanism and for altering the time interval between the feeding of successive cards to said registering means in the event of any difference in said successive cards.

73. In a card accounting machine, the combination of a card-controlled registering mechanism, total taking mechanism and means to automatically effect a dwell in the operation of said registering mechanism and means to automatically operate the total taking mechanism during said dwell.

74. In combination, automatic registering mechanism controlled by record control-devices; automatic total-taking mechanism; and means also controlled by said devices for automatically initiating and effecting automatic total-taking by said total-taking mechanism.

75. In combination, automatic registering mechanism controlled by record cards; automatic total-taking mechanism; and means controlled by said record cards for automatically initiating and effecting automatic total-taking by said total-taking mechanism.

76. In combination, automatic registering mechanism actuated by register-controlling record cards; automatic total-taking mechanism; and means controlled by a difference between said cards for automatically initiating automatic total-taking by said total-taking mechanism.

77. In a machine of the class described the combination of perforated-card-controlled mechanism and a finder having two parts, the first of which determines its position for each card in succession and the second of which takes its position from the first and is automatically locked in such position until the first part takes a new position.

78. In a machine of the class described the combination of perforated-card controlled mechanism and a finder having two parts, the first of which determines its position for each card in succession and the second of which takes its position from the first and is locked in such position until the first part takes a new position, and means for permitting the regular operation of the machine as long as the position taken by the first part corresponds with that of the second and for interrupting the regular operation of the machine otherwise.

79. In an apparatus of the character described, the combination of an accounting machine, having a total taking mechanism, a card analyzer, means controlled by the cards for rendering the analyzer inoperative, means for causing the total taking mechanism to operate when said analyzer is rendered inoperative, and means for causing the resumption of operation of said analyzer after the total is taken.

80. In an apparatus of the character described, the combination of an accounting machine having a total taking mechanism, a card analyzer, card sensing means settable according to the designation of a group of cards, means controlled by the cards for rendering the analyzer inoperative whenever said sensing means is changed, means for causing the total taking mechanism to operate when said analyzer is rendered inoperative, and means for causing the resumption of operation of said analyzer and sensing means after a total is taken.

81. In an apparatus of the character described, the combination of an analyzer element; and an accounting machine provided with a total taking and registering mechanism either of which may be operatively connected to any of said elements.

82. In an apparatus of the character described, the combination of analyzer element; and an accounting machine provided with a total taking and a registering mechanism both operatively connected to certain of said elements.

83. In an apparatus of the character described, the combination of analyzer elements; and an accounting machine provided with a total taking mechanism operatively connected with some of said elements, and a registering mechanism operatively connected to all of said elements.

84. In an apparatus of the character described, the combination of analyzer elements; an accounting machine provided with a total taking and a registering mechanism; and means whereby said total taking mechanism may be at will operatively associated with any of said elements.

85. In an apparatus of the character described, the combination of an analyzer having rows of analyzer elements; an accounting machine provided with a total taking and a registering mechanism both operatively connected to any of said rows of elements; and means whereby said total taking mechanism may be at will disconnected from said rows.

In witness whereof, I have hereunto set my hand at Indianapolis, Indiana, this sixth day of June, A. D. one thousand nine hundred and seventeen.

CHARLES A. TRIPP.